(12) United States Patent
Tuzhilin et al.

(10) Patent No.: US 7,603,331 B2
(45) Date of Patent: Oct. 13, 2009

(54) SYSTEM AND METHOD FOR DYNAMIC PROFILING OF USERS IN ONE-TO-ONE APPLICATIONS AND FOR VALIDATING USER RULES

(75) Inventors: Alexander S. Tuzhilin, New York, NY (US); Gediminas Adomavicius, Jersey City, NJ (US)

(73) Assignee: New York University, New York, NY (US)

( * ) Notice: Subject to any disclaimer, the term of this patent is extended or adjusted under 35 U.S.C. 154(b) by 360 days.

(21) Appl. No.: 11/074,157

(22) Filed: Mar. 7, 2005

(65) Prior Publication Data

US 2005/0149460 A1 Jul. 7, 2005

Related U.S. Application Data

(63) Continuation of application No. 09/554,383, filed as application No. PCT/US98/24339 on Nov. 13, 1998, now Pat. No. 6,871,186, which is a continuation-in-part of application No. 08/970,359, filed on Nov. 14, 1997, now Pat. No. 6,236,978.

(51) Int. Cl.
*G06F 17/00* (2006.01)
*G06N 5/00* (2006.01)
(52) U.S. Cl. .................................. 706/45; 706/48
(58) Field of Classification Search ............... 705/10
See application file for complete search history.

(56) References Cited

U.S. PATENT DOCUMENTS 4,775,935 A 10/1988 Yourick
5,487,130 A 1/1996 Ichimori et al.
5,625,754 A 4/1997 Jungst et al.
5,636,346 A * 6/1997 Saxe .......................... 705/1

(Continued)

FOREIGN PATENT DOCUMENTS

WO 9926180 5/1999

OTHER PUBLICATIONS

E. Rich, "User Modeling via Stereotypes", Cognitive Science 3, 329-354 (1979).

(Continued)

*Primary Examiner*—David R Vincent
*Assistant Examiner*—Adrian L Kennedy
(74) *Attorney, Agent, or Firm*—Dorsey & Whitney LLP

(57) ABSTRACT

A system and method for generating and validating a user profile (25) for a user based on a static profile (10) and a dynamic profile (15) of the user. The method and system compresses the dynamic rules (15) into aggregated rules so that the user can view a comparatively small number of the aggregated rules and select the desired rules from the aggregated rules based on user desired criteria. The method and system validates user rules (60) using a processing device, which are retrieved from a storage device. The user rules are separated into at least one subset of a user set. Then, it is determined if a particular rule of the at least one subset is one of acceptable, unacceptable and undecided based on a defined criteria (415). If the particular rules of the at least one subset are acceptable, the particular rules of the at least one subset are provided (e.g. assigned) to a corresponding user (435).

59 Claims, 16 Drawing Sheets

U.S. PATENT DOCUMENTS

| | | | |
|---|---|---|---|
| 5,710,884 A | | 1/1998 | Dedrick |
| 5,717,923 A | * | 2/1998 | Dedrick ..................... 707/102 |
| 5,724,521 A | * | 3/1998 | Dedrick ....................... 705/26 |
| 5,724,573 A | | 3/1998 | Agrawal et al. |
| 5,727,129 A | | 3/1998 | Barrett et al. |
| 5,727,199 A | | 3/1998 | Chen et al. |
| 5,749,081 A | | 5/1998 | Whiteis |
| 5,790,645 A | | 8/1998 | Fawcett et al. |
| 5,848,396 A | * | 12/1998 | Gerace ........................ 705/10 |
| 5,867,799 A | | 2/1999 | Lang et al. |
| 5,930,764 A | * | 7/1999 | Melchione et al. ............ 705/10 |
| 5,943,667 A | * | 8/1999 | Aggarwal et al. .............. 707/3 |
| 5,970,482 A | | 10/1999 | Pham et al. |
| 5,974,396 A | * | 10/1999 | Anderson et al. ............. 705/10 |
| 6,012,051 A | | 1/2000 | Sammon, Jr. et al. |
| 6,014,638 A | * | 1/2000 | Burge et al. ................... 705/27 |
| 6,041,311 A | | 3/2000 | Chislenko et al. |
| 6,049,777 A | | 4/2000 | Sheena et al. |
| 6,092,049 A | | 7/2000 | Chislenko et al. |
| 6,112,186 A | | 8/2000 | Bergh et al. |
| 6,134,532 A | | 10/2000 | Lazarus et al. |
| 6,236,978 B1 | | 5/2001 | Tuzhilin |
| 6,996,572 B1 | * | 2/2006 | Chakrabarti et al. ........ 707/102 |

OTHER PUBLICATIONS

"Creating a New Medium for Marketing and Selling", BroadVision, May 10, 1997.
"Firefly Ships Internet's First Solaris Solution for Managing Personalized Relationsuips with Users Online while Protecting their Privacy", Firefly Press Release, Oct. 14, 1997.
Engage Technologies, a Subsidiary of DMG Information Services, Inc., Launches a Suite of Advanced Enabling Technologies for Accelerated, One-to_one Web Marketing, Engage Technologies, Inc., Press Release 1997.
C. Shum et al., "Implicit Representation for Extensional Answers", Expert Database Systems, Benjamin/Cummings Publishing Co., Inc., International Conference on Expert Database Systems, 1988, pp. 497-521.
H. Zimmermann, "Fuzzy Set Theory—and Its Applications", Kluwer-Nijhoff Publishing, pp. 11-22.
J. Quinlan, "C4.5: Programs for Machine Learning", Morgan Kaufmann Publishers, pp. 1-54.
L. Breiman et al., "Classification and Regression Trees", Wadsworth International Group, pp. 18-27.
A. Jhingran, "Data Mining and E-Commerce", IBM TJ Watson Research Center, Oct. 1997.
T. Fawcett et al., "Combining Data Mining and Machine Learning for Effective User Profiling", NYNEX Science and Technology.
"Engage Suite of Products", Engage Technologies.
M. Tucker, "Dough". Datamation, May 1997, pp. 51-58.
R. Cooley et al., "Grouping Web Page Reference into Transactions for Mining World Wide Web Browsing Patterns", Knowledge and Data Engineering Exchange Workshop, 1997, Proceedings, pp. 2-9.
Jesus Cerquides et al., "Fuzzy Metaqueries for Guiding the Discovery Process in KDD", Fuzzy Systems, 1997, vol. 3, Proceedings of the Sixth IEEE International Conference, pp. 1555-1559.
A.I. Kokkinaki, "On Atypical Database Transactions: Identification of Probable Frauds Using Machine Learning For User Profiling", Knowledge and Data Engineering Workshop, 1997, Proceedings, pp. 107-113.
Mike Hogan, Sattellites, Radio, and Super Wireless for New High-Speed Net Access:, PC World, Oct. 1997, p. 68-72.
Ch. Dujet et al., About Modus Ponens and Aggregation of Rules;, Fuzzy Systems, Mar. 1995, p. 1825-1832.
Rakesh Agrawal et al., "Database Mining A Performance Perspective", IEEE Transactions on Knowledge and Data Engineering, Dec. 1993, p. 914-925.
Eutani Kim et al., "A New Approach to Fuzzy Modeling", IEEE Transactions on Fuzzy Systems, Aug. 1997, p. 3428-337.
C.B. Kappert et al., "Neural Nerworks and Business Modelling-An Application of Neural Modelling Techniques to Prospect Profiling in the Telecommunications Industry", System Sciences, Jan. 1997, p. 465-473.
Mika Klemettinen et al., "Finding Interesting Rules from Large Sets of Discovered Association Rules", ACM, Nov. 1994, p. 401-407.
R.R. Yager, "Fuzzy Summaries in Database Mining", Artificial Intelligence for Applications, Feb. 1995, p. 265- 269.
T. Fawcett et al., "Adaptive Fraud Detection", Data Mining and Knowledge Discovery, vol. I, No. 3, Nov. 1987, pp. 291-316.
B. Lent et al., Clustering Association Rules:, Proc. of 13th International Conference on Data Engineering, Apr. 1997, U.K., pp. 1-19.
M. Pazzani et al., "Syskill & Webert: Identifying Interesting web sites", Proceedings of the National Conference on Artificial Intelligence, 1996.
M. Pazzani et al., "Learning and Revising User Profiles: The Identification of Interesting Web Sites", Machine Learning, 27, 1997, pp. 313-331.
Bruce Krulwich, "Lifestyle Finder: Intelligent User Profiling Using Large-Scale Demographic Data", Al Magazine, Summer 1997, p. 37-45.
K.L. Wu et al. "Speedtracer: A Web usage mining and tool", IBM Systems Journal, vol. 37, No. 1, 1998, p. 89-105.
Beverly Cramp, "Reading Your Mind", Marketing, Feb. 22, 1996 p. 33-34.
Imielinski et al., "A Database Perspective on Knowledge Discovery", Communications of the ACM, Nov. 1996, v39, n11, p. 58(7).
Szladow et al., "Rough sets: Working with Imperfect Data", Al Expert, Jul. 1993, v8, n7, p. 36(6).
Amihai Motro, "Using Integrity Constraints to Provide Intensional Answers to Relational Queries", Computer Science Dept. Univ. Of South California, Proceedings of the Fifteenth International Conference on Very Large Data Bases, Amsterdam, 1989, p. 237-245.
S.H. Clearwater et al., "RL4: A Tool for Knowledge-Based Induction", Dept. Of Computer Science, Univ. Of Pittsburgh, IEEE 1990, 24-30.

* cited by examiner

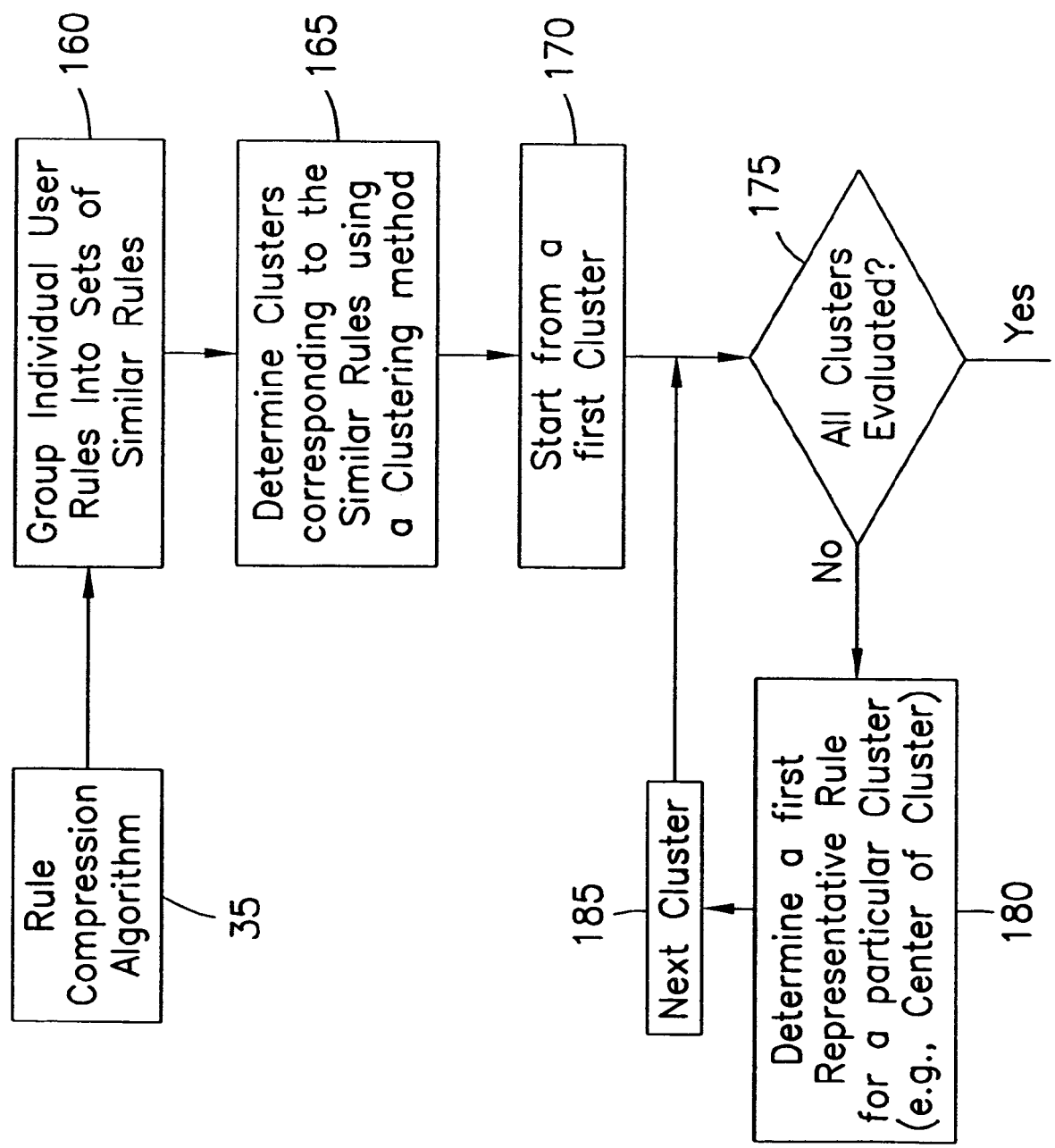
Fig. 4.1

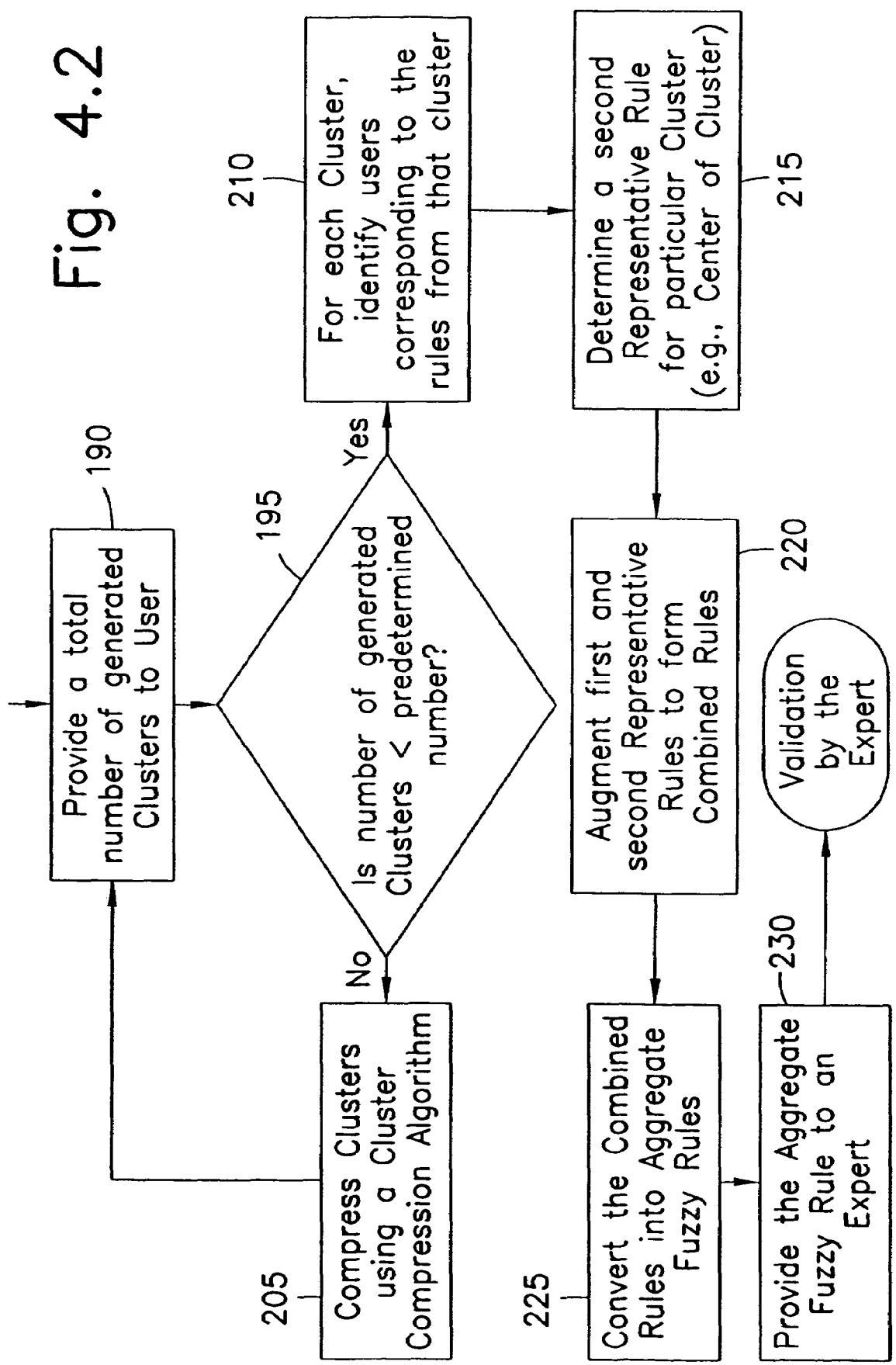
Fig. 4.2

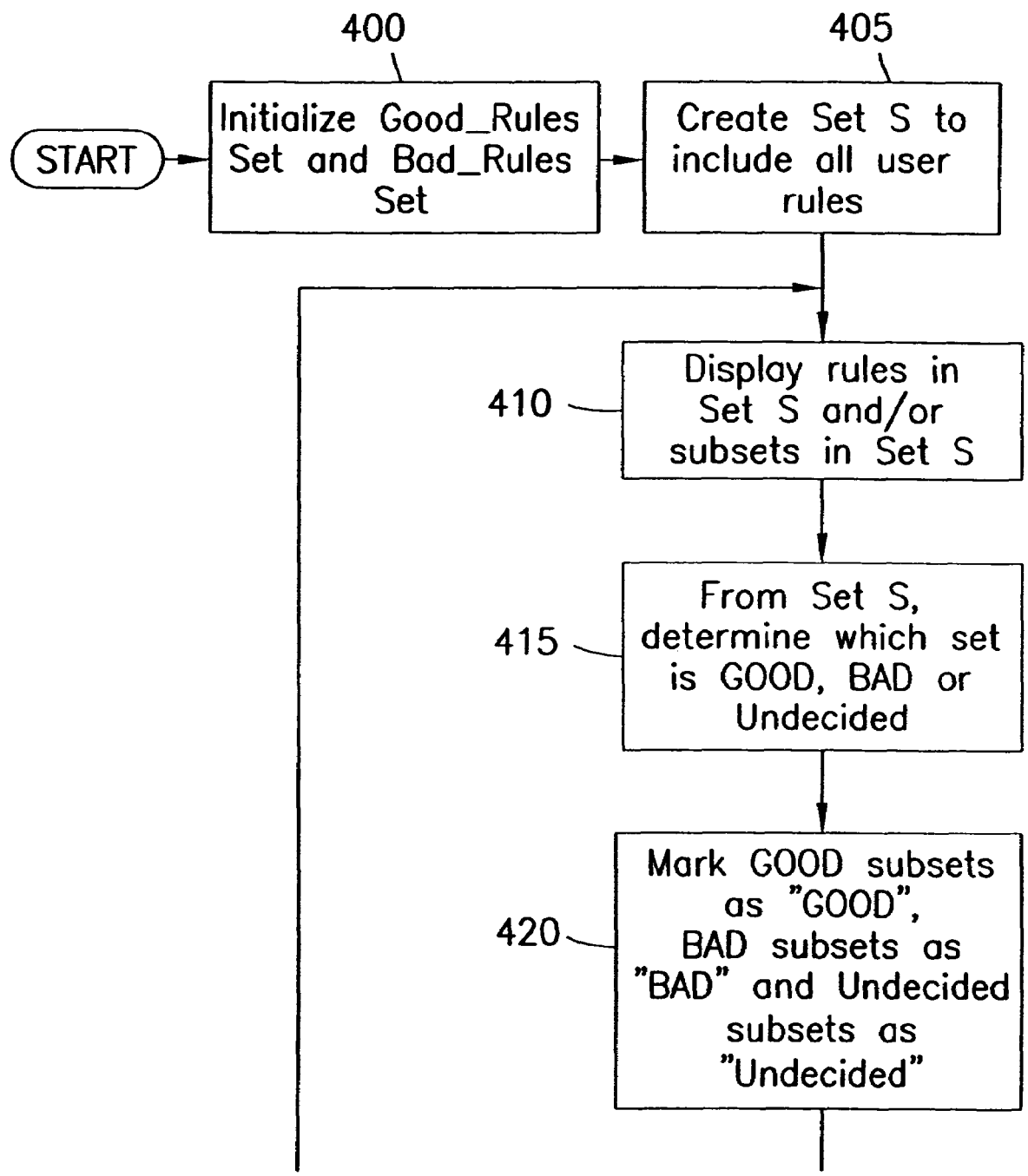
Fig. 9.1

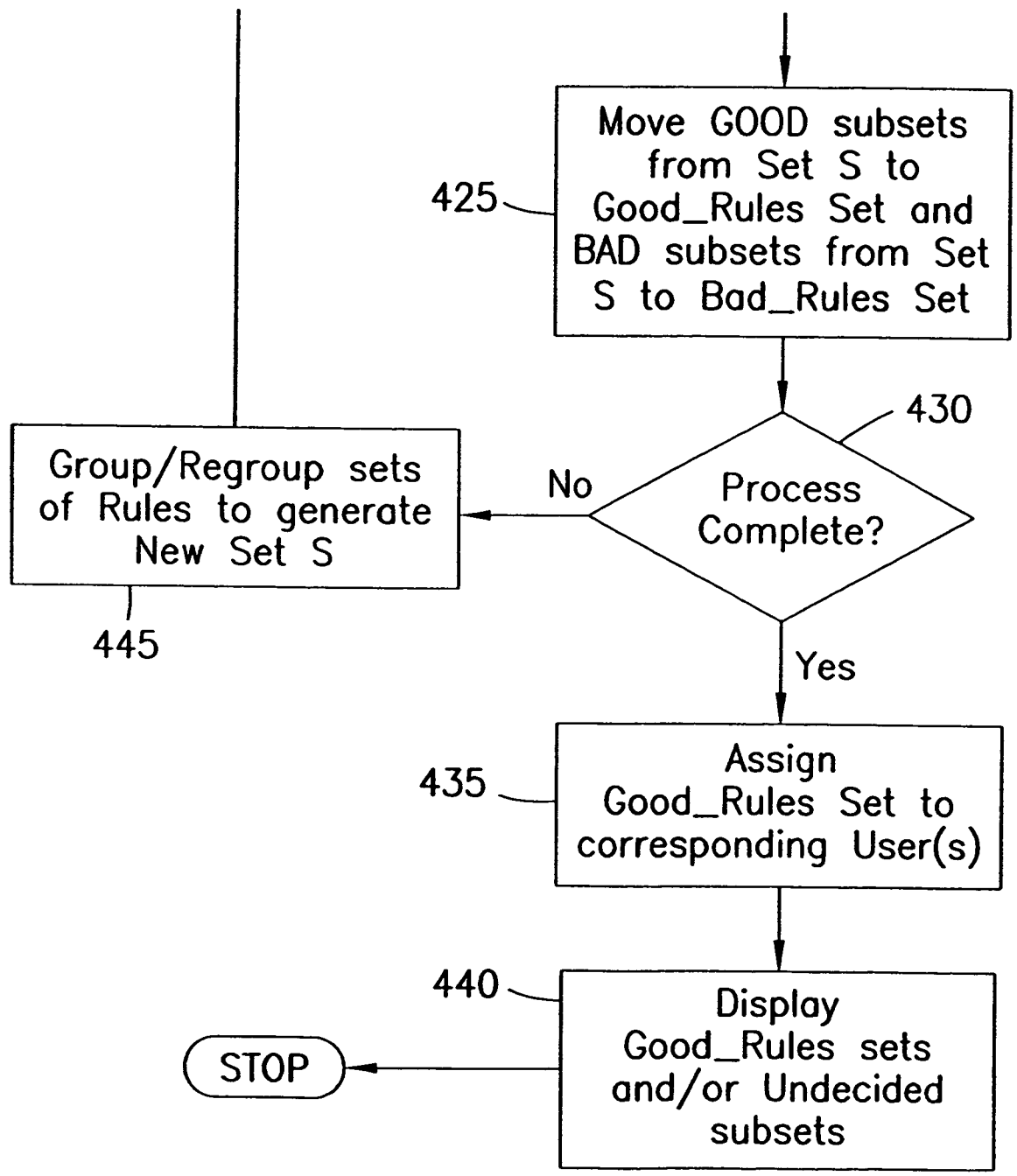
Fig. 9.2

SYSTEM AND METHOD FOR DYNAMIC PROFILING OF USERS IN ONE-TO-ONE APPLICATIONS AND FOR VALIDATING USER RULES

CROSS-REFERENCE TO RELATED APPLICATIONS

This application is a continuation of U.S. application Ser. No. 09/554,383, filed May 12, 2000 now U.S. Pat. No. 6,871,186 (the "'383 Application"), which is a national phase application of International Patent Application No. PCT/US98/24339 filed Nov. 13, 1998. The '383 Application is a continuation-in-part application of U.S. patent application Ser. No. 08/970,359, filed Nov. 14, 1997, which issued as U.S. Pat. No. 6,236,978. The entire disclosures of each of the applications referenced above are incorporated herein by reference.

FIELD OF THE INVENTION

The present invention relates to a system and method for dynamic profiling of a user in one-to-one marketing applications.

BACKGROUND INFORMATION

Many organizations collect historical data about every transaction that every customer performs with that organization. Such historical transactional data is useful in various one-to-one marketing applications, such as, e.g., shopping assistant application and dynamic Web site content presentation. A number of problems have been encountered in these marketing applications. One such problem relates to the creation of highly pertinent and comprehensible individual user profiles that are derived from the historical transactional data. In addition, it is also important to have the ability to utilize these user profiles when the marketing application obtains a current status of the user. If the user profiles are generated in a highly relevant and comprehensible manner with respect to a specific user, the applications would be able to understand that user's needs better and more efficiently serve that user.

There are two basic types of user profiles that can be generated—a "static" profile and a "dynamic" profile. The static profile contains all of the factual information of the user including, for example, demographic data (e.g., age, sex, address), psychographic data (e.g., personality traits and habits), purchasing preferences (e.g., what does the user purchase in an average week), etc. Static profiles are generated using conventional methods that are known to those of ordinary skill in the art.

Dynamic profiling information includes specific rules describing the user's behavior. For example, such rules may include: "whenever user X travels to France, user X often buys expensive wines in Paris" or "when user Y shops on a weekend and did not buy any groceries for at least 3 days, user Y usually purchases a large amount of groceries." These rules can be generated with transactional data for each user using various rule generation methods that are generally known to those of ordinary skill in the art. For example, one such conventional rule generation method is implemented in a rule learning system which generates behavior rules for individual customers. (See T. Fawcett et al., "Combining Data Mining and Machine Learning for Effective User Profiling", Proceedings of the KDD'96 Conference, 1996, pp. 8-13).

In order to obtain an extensive understanding of the user, it is desirable to build both static and dynamic profiles for that user. Although the generation of static profiles is generally straight-forward, generating dynamic profiles for a large number of users may present potential problems. Many transactional systems (e.g., airline reservations systems, credit card transactional systems and/or Web site management systems) generate a various number of transactions for each user. For example, some systems and/or applications may only generate a dozen transactions per each user, which may not be enough to construct a statistically significant and reliable set of rules for a specific user. Even if there are enough transactions to construct a statistically significant set of rules, these rules should still be verified for their pertinence to the user. Since there can be a large number of users, and since the rules generated for each user may not be reliable, there is a problem of verifying a large set of generated rules for the users. For example, in a typical system facilitating 5 million users and providing about 100 rules per user, approximately 500 million rules would have to be either stored or processed. Generally, many of these rules are either not useful or insignificant. Thus, due to the amount of these generated rules, a rule validation process becomes considerably complicated. Furthermore, checking the usefulness of these rules "by hand" becomes practically impossible.

Conventional systems have not successfully provided detailed solutions to constructing reliable dynamic profiles for the users. One such system (described in T. Fawcett et al., "Combining Data Mining and Machine Learning for Effective User Profiling", Proceedings of the KDD'96 Conference, 1996) provides a limited generation of user's dynamic profiles. However, this conventional system does not provide a comprehensive method and system for analyzing a large number of dynamic rules, and thus does not provide adequate assistance for the user.

SUMMARY OF THE INVENTION

The system and method according to the present invention generates dynamic profiles and, thereafter, transforms the dynamic profiles for various users into aggregate rules. In particular, "similar" individual rules are compressed into a smaller number of aggregated rules. Because the total number of aggregate rules is substantially smaller than the total number of individual rules for all of the users, the aggregate rules can be examined manually by a human expert. This expert examines these aggregated rules and selects only rules based on the expert's preferences. Only the individual rules that correspond to the aggregated rules selected by the human expert are retained in the user's profiles. Since the selected aggregate rules were selected by the human expert, a creation of more accurate dynamic profiles is further assured. The system and method according to the present invention thus provide a more useful set of individual rules for each user.

The dynamic profiles generated with the system and method according to the present invention can be used in various systems (e.g., Personal Shopping Assistant and Personal Intelligent Digital Assistant) to provide better recommendations to the users as to which products and services each individual user should utilize. Accordingly, the user would be more satisfied with these systems and the suggestions that these systems provide to the user. In addition, Dynamic Web Content Presentation systems can include the system and method according to the present invention because the users will be provided with better quality profiles to facilitate the provision of more pertinent Web pages to the user visiting a particular Web site. Fraud detection systems may also include the system and method according to the present invention, thus providing higher quality user profiles which may facilitate better fraud detection. Other applications for the system and method according to the present invention are also conceivable to those of ordinary skill in the art.

In addition, the system and method according to the present invention utilizing the above-described rule compression method is not limited to a construction of pertinent dynamic profiles, and can be used in a vast variety of applications (e.g., construction of high quality association rules in data mining applications). Other usages of the system and method according to the present invention are also conceivable to one having ordinary skill in the art.

In another embodiment of the system and method according to the present invention, the user rules are validated using a processing device. These user rules are retrieved from a storage device. The user rules are then separated into at least one subset of a user set. Then, it is determined if particular rules of the at least one subset is one of acceptable, unacceptable and undecided based on a defined criteria. If the particular rules of at least one subset are acceptable, the particular rules of the at least one subset are provided to a corresponding user.

When constructing good dynamic profiles, validation is an important consideration. It is possible to construct dynamic profiles for individual customers using any existing data mining methods. For example, an exemplary user rule may indicate that whenever a user buys milk in the evening, this user also buys onions. It is difficult to ascertain if this rule adequately describe the user's behavior. In fact, it may be a statistical coincidence. Therefore, it is preferable to allow the user (or a human expert) to examine groups of the user rules.

BRIEF DESCRIPTION OF THE DRAWINGS

FIG. 4 shows a detailed flow diagram of an exemplary rule compression process according to the present invention.

FIG. 6b shows a first system for generating the user profiles according to the present invention as illustrated in FIG. 6a.

FIG. 6c shows a second system for generating the user profiles according to the present invention as illustrated in FIG. 6a.

FIG. 9 shows a flow diagram of an exemplary embodiment of a process executed by the selective validation module (illustrated in FIG. 8).

DETAILED DESCRIPTION OF THE INVENTION

Figure 1:
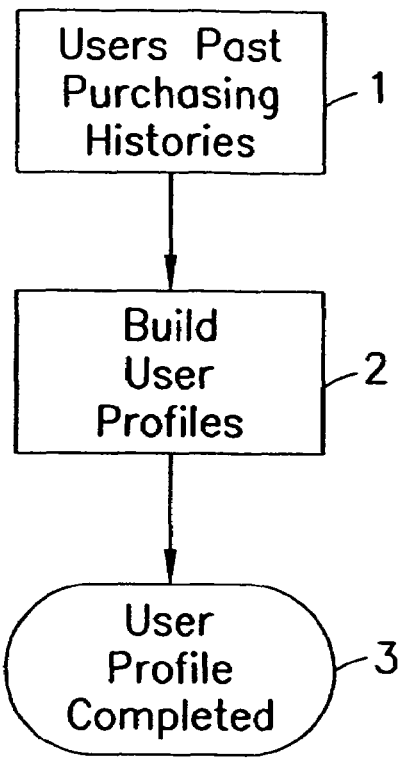
FIG. 1 shows a top level diagram of a process for generating user profiles.
Figure 2:
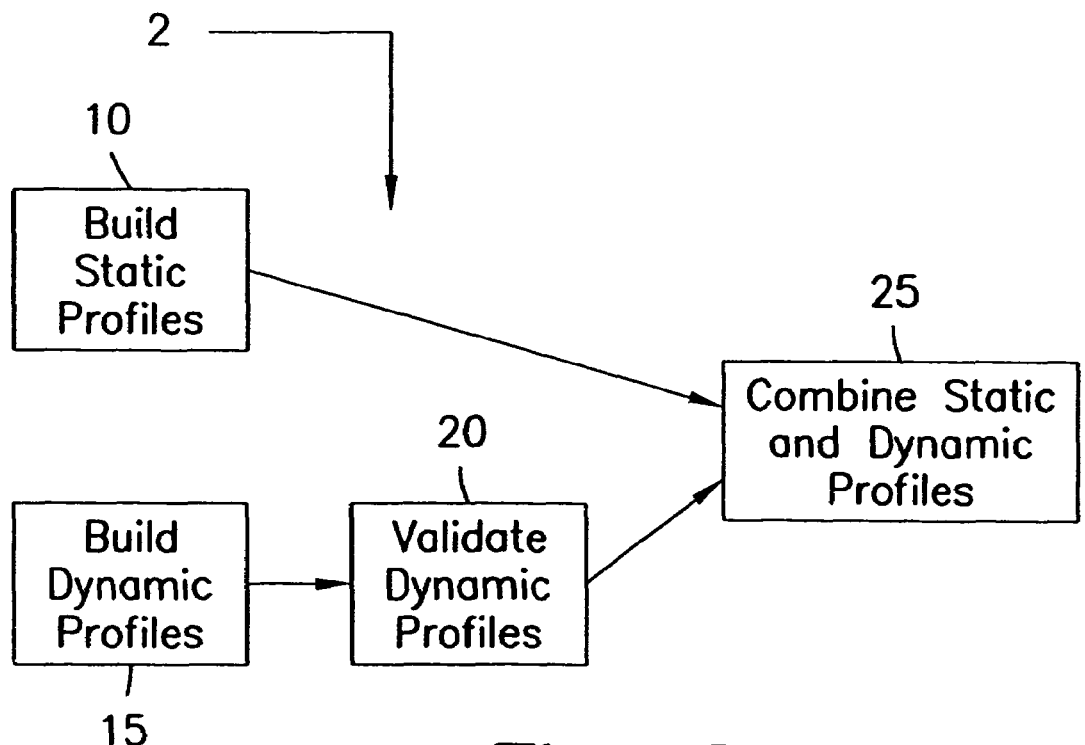
FIG. 2 shows a flow diagram for generating static and dynamic user profiles.

In many customer-related applications (e.g., banking, credit card, Internet marketing applications, etc.), user profiles for each user (or customer) are generated to better understand the user (i.e., user's purchasing trends, business travel locations, types of favorite restaurants, etc.). A flow diagram of an exemplary process for building user profiles is illustrated in FIG. 1. In particular, information regarding, e.g., the user's past purchasing history is retrieved in step 1. In step 2, user profiles are built, and the process completion is signaled in step 3. User profiles can preferably be generated using static profiles and dynamic profiles. A more detailed flow diagram of the process of building user profiles (represented in FIG. 1 by step 2) is illustrated in FIG. 2. The static profile includes user static characteristics (e.g., name of the user, address, telephone number, date of birth, sex, income, etc.). The static profile is built in step 10 using methods known to one having ordinary skill in the art. After the static profile is built, this static profile is stored in a separate file based on the data obtained from the CUST and TRANS files, as discussed below. The "CUST" file has the following format:

$$CUST(Cust\_ID, A_1, A_2 \ldots A_m),$$

where Cust_ID is a user identifier that provides an index value for locating a specific user in the CUST file. $A_1, A_2 \ldots A_m$, are fields describing the characteristics of the user (e.g., sex, income, education, etc.).

The dynamic profile is built in step 15. A dynamic profile consists of rules (or patterns) characterizing a user's behavior, e.g., "if user X shops in the evening on weekdays and purchases diapers, user X also buys beer", "if user X shops on weekdays, user X usually buys a small number of items", "if user X travels to New York on business, user X prefers to have lunches at expensive seafood restaurants." The rules are derived from a set of transactions pertaining to a particular user. These transactions may be, for example, credit card transactions, airline reservations and Web site visit transactions, and are stored in the "TRANS" file which has the following format:

$$TRANS(Trans\_ID, Cust\_ID, C_1, C_2, \ldots C_n)$$

where Trans_ID corresponds to a unique index key that identifies the transaction being performed by the user. Fields $C_1, C_2, \ldots C_n$ identify a particular transaction (e.g., date of transaction, time of transaction, amount spent, location of the transaction, etc.). The field "Cust_ID" corresponds to an index key pointing to a particular user having a respective record in the CUST file. Thus, the user performing a particular transaction can be identified. Other file formats can also be utilized, as can be understood by those having ordinary skill in the art. For example, the user-specific information can also be stored in several files rather than in a single CUST file (thus, the CUST file can be normalized by splitting the CUST file into several smaller files). Using different file formats does not affect the operability of the system and process according to the present invention. After the dynamic profile for a particular user is generated, this dynamic profile is validated in step 20.

After the validation of the dynamic profile, the static and dynamic profiles are combined to form a combined user profile in step 25. The following exemplary information can be obtained from the TRANS file to be provided into the static profile when the static and dynamic profiles (the CUST and TRANS files) are combined: a) an average transaction amount for user X; b) user X's favorite brand of beer is, e.g., Heineken; c) user X shops mostly on week-ends.

While it is relatively uncomplicated to construct user static profiles, it is much more difficult to construct quality dynamic profiles. Rules provided in the dynamic profile are generated for each user. Because a user may perform only a small number of transactions, the corresponding rules generated may be statistically insignificant, unreliable and irrelevant. In many systems (e.g, airline reservations systems, credit card transactional systems, or Web site usage systems), it is possible to have from as little as a few dozen to a few hundred transactions per each user. The rules generated with such amounts of data are often ineffective and insignificant.

The total number of generated rules can also be very large. For example, in a system serving 5 million customers and generating an average of 100 rules per user, a total number of generated rules can reach 500 million. Many of the 500 million generated rules are of questionable quality and usefulness. In order to filter the rules having such undesirable characteristics, a human expert must decide which dynamic rules should be stored and which dynamic rules should be discarded. It would be impossible for the human expert to manually check the usefulness of all 500 million rules.

Quality dynamic profiles are generated by validating dynamic rules generated using various rule induction methods. Ultimately, however, the human expert validates the machine-generated rules to determine their "usefulness" in various systems. Since most of the systems generate too many rules to be manually examined by human experts, the system and method according to the present invention facilitates compressing individual rules into "aggregated" rules. After the individual rules are compressed into the aggregated rules, the aggregated rules are evaluated by a human expert who selects only the rules that the expert believes are pertinent for the user. In addition, it is possible (in some applications) that the respective user can be such a human expert (and examining only the rules that are pertinent to the respective user).

A. Dynamic Profile Construction Procedure

It can be assumed that user-specific rules have been already created using methods known to those having ordinary skill in the art. For example, individual user rules can be generated using an induction software system (e.g., "CART" Breiman et al., 1984; C4.5, Quinlan, 1993; or RL, Clearwater & Provost, 1990). The structure of these rules has, preferably, the following form:

$$C_{i1}\theta_{i1}a_{i1} \wedge C_{i2}\theta_{i2}a_{i2} \wedge \ldots \wedge C_{ik}\theta_{ik}a_{ik} \Rightarrow C_i\theta_i a_i \quad (1)$$

where $C_{i1}, C_{i2}, \ldots, C_{ik}, C_i$ are fields from the TRANS file, $a_{i1}, a_{i2}, \ldots, a_{ik}, a_i$ are constants, and $\theta_{ij}$ are relational operators (e.g., "=", ">", "<", etc.). In addition, each rule is assigned to a user defined by the Cust_ID (user identifier) from the CUST file.

Figure 3:
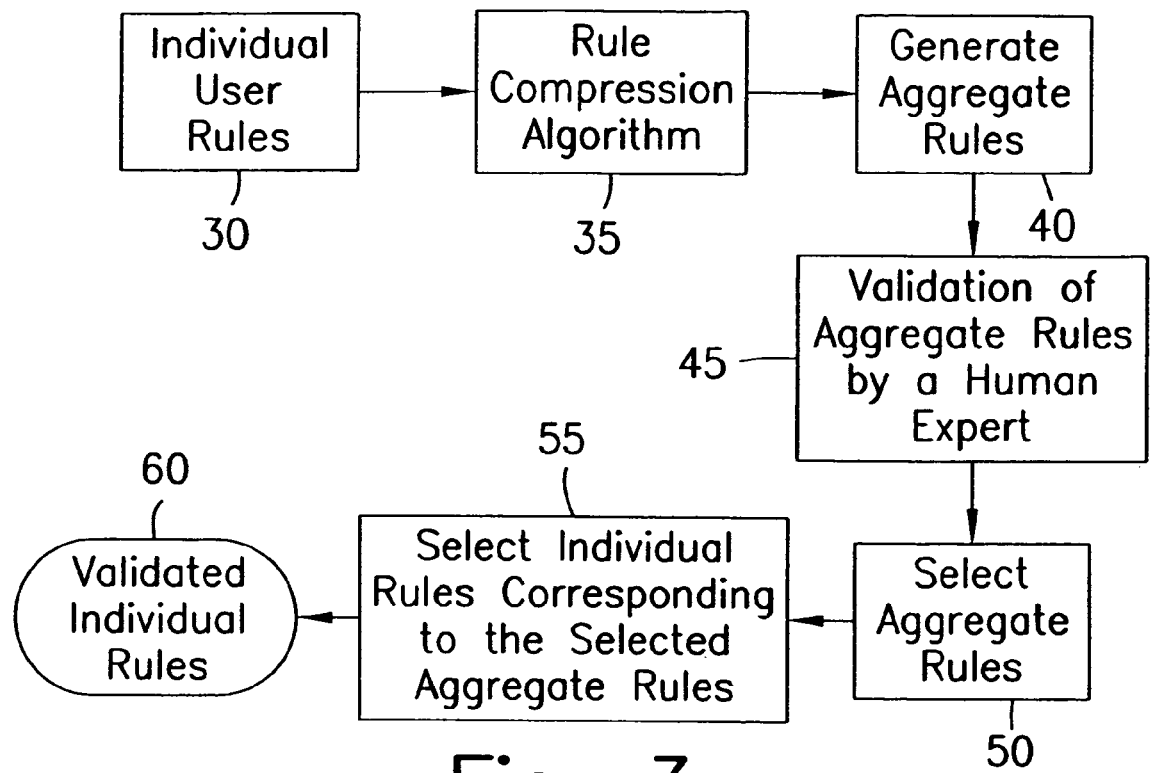
FIG. 3 shows a flow diagram of a process for compressing dynamic rules, generating aggregate rules, validating the aggregate rules and creating user profiles.

Next, it is important to remove "useless" individual rules from the total number of rules. A process to remove these useless individual rules is shown in FIG. 3. In step 30, individual rules are provided for processing. In step 35 several "similar" individual rules (of the form (1)) are compressed into one aggregated rule of the form:

$$A_{i1}\theta_{i1}b_{i1} \wedge A_{i2}\theta_{i2}b_{i2} \wedge \ldots \wedge A_{ij}\theta_{ij}b_{ij} \wedge C_{i1}\theta_{i1}a_{i1} \wedge C_{i2}\theta_{i2}a_{i2} \wedge \ldots \wedge C_{ik}\theta_{ik}a_{ik} \Rightarrow C_i\theta_i a_i \quad (2)$$

where $A_{i1}, \ldots, A_{ij}$ are the fields in the CUST file, $b_{i1}, \ldots, b_{ij}$ are constants, and $\theta_{ij}$ are relational operators (e.g., "=", ">", "<", etc.). For each individual rule of the form (1), the aggregated rule of the form (2) is formed after the individual rules are compressed. The newly aggregated rules (formed in step 40) can be, e.g., fuzzy rules, and the operators $\theta_{ij}$ should also be, e.g., fuzzy operators. For example, several of the individual rules that are similar (generally pertaining to different users) can be compressed into one aggregated rule pertaining to the same subject matter that can be applicable to several users. For example, if several rules have the form:

IF Shopping_time="evening" and
    Day_of_week="weekday" and
    Purchase="diapers" THEN Purchase="beer", and it is known that most of the users corresponding to this rule are males, then these rules can be compressed into the aggregated rule having the following form:

IF Sex="Male" and Shopping_time="evening" and
    Day_of_week="weekday" and
    Purchase="diapers" THEN Purchase="beer".

Additional fields (e.g., Sex, etc.), unlike other fields in the above exemplary rule, are fields from the CUST file. Individual rules relating to different users can be compressed into the same aggregated rule for a group of users. Thus, the rule compression can preferably be implemented for different users. The number of aggregated rules (of the form (2)) generated by the compression algorithm should be much smaller than the initial number of individual rules. Then, in step 45, the aggregated rules can be validated (one by one) by the human expert (including a particular user) to determine which rules are appropriate for that user. After the user validates the aggregated rules, this user selects the set of preferred aggregated rules in step 50. Only the individual rules corresponding to the aggregated rules selected in step 50 are retained in the user's dynamic profile (step 55) to provide validated individual rules (step 60) to the user.

B. Rule Compression Process

FIG. 4 illustrates a detailed flow diagram of an exemplary rule compression process (starting from step 35 in FIG. 3). Two individual rules of the form (1) are referred to as "similar" rules if they differ from each other only in the values of their respective constants $a_{ij}$. Thus, similar rules should have the same number of terms, the same fields $C_{ij}$, and the same comparison operators $\theta_{ij}$. Similar rules can be mapped into the (k+1) dimensional space defined by $Dom(C_{i1}) \times \ldots \times Dom(C_{ik}) \times Dom(C_i)$, where Dom is a domain (or range of values) of the field C, with a rule having the form (1) being mapped into the points (i.e., $a_{i1}, a_{i2}, \ldots, a_{ik}, a_i$). This set of points is generated by similar rules. For example, the rule "if user X shops in the evening on weekdays and purchases diapers, user X also buys beer" can be written as:

IF (Shopping_time="evening" and
    Day_of_week="weekday" and
    Purchase="diapers") THEN Purchase="beer".

This sample rule would be mapped into the corresponding vector ("evening", "weekday", "diapers", "beer") of the 4-dimensional space of attributes (variables):Shopping_time, Day_of_week, Purchase and another Purchase.

The exemplary rule compression process (described below in detail) then generates rules (e.g., fuzzy rules of the form (2)). These fuzzy rules utilize fuzzy linguistic variables for the fields from the CUST and TRANS files, which are generally known to those having ordinary skill in the art. Each fuzzy linguistic variable has a corresponding identifier (e.g., Income, Transaction_Amount, etc.), each being capable of providing a range of values (e.g., natural numbers between 0 and 1,000,000), a set of terms (e.g., "low", "medium", "high", etc.), and a membership function that assigns a membership value (e.g., between 0 and 1) to each value from the domain of the fuzzy linguistic variable for each range of values. In addition, the non-ordered fields in the CUST and TRANS files (e.g., "Product_Purchased") have assigned classification hierarchies; for example, the field "Product_Purchased" can include standard classification hierarchies used in marketing. Thus, UPCs, e.g., can be grouped into brands, brands can be grouped into product categories, etc.

The following exemplary inputs are provided to the Rule Compression Process:
 a. Individual rules from users' dynamic profiles.
 b. Fuzzy linguistic variables for all fields in the CUST and TRANS files.
 c. Hierarchical classifications for non-ordered fields.

Exemplary outputs generated by the Rule Compression Process are a set of (preferably) fuzzy aggregated rules having the form (2).

The steps of the exemplary rule compression process shall now be described in detail with reference to FIG. 4. In step 160, all the individual rules of the form (1) are grouped into sets of similar rules (i.e., rules having the same structure). The maximal number of such similar groups is $4^n$, where n is the number of fields in the TRANS file. For example, if n=10, then there can be at most $1 \times 2^{20}$ similar groups. However, this number is typically much smaller in practice. Each set of similar rules forms a set of points in a k-dimensional space generated by the individual rules described above. In step 165, a group of clusters of the generated points is determined using any of the cluster computation methods known to those of ordinary skill in the art. In step 170, starting from the first cluster of the group of clusters determined in Step 165, an approximate rule for that cluster is determined in Step 180. The approximate rule is determined as a function of the points in the cluster. For example, a point in the cluster may be the "center" of the cluster. The center can be identified as a point that minimizes the sum of distances from a particular point to other points in the cluster. For example, given Cluster $C_i = (c_{i1}, c_{i2}, \ldots c_{ik})$, the center of this cluster is the point that minimizes the expression:

$$\min_{c_i} \sum_{x \in Clust_i} d(x, c_i)$$

The center of the cluster can also be determined using other methods, such as, e.g., selecting the most "representative" point in that cluster.

In step 185, the next cluster is selected and the procedure described with respect to step 180 is repeated. In step 175, it is determined whether all of the clusters in the group of clusters have been evaluated. As an illustration, if cluster $Clust_i$ contains three 3-dimensional points (0,0,1), (0,1,0), (1,0,1), corresponding to the vertices of a equilateral triangle, then the center of this cluster $C_i$ is the center of the triangle, i.e., the point (½, ½, ½). Other approaches to defining the center of a cluster can be used. This exemplary rule compression process does not depend on any specific method for defining any center of a cluster $C_i$.

Given the set of rules (1) corresponding to the cluster with the center $C_i = (c_{i1}, c_{i2}, \ldots c_{ik})$, the corresponding aggregated rule has the form:

$$C_{i1}\theta_{i1}c_{i1}{}^{\wedge}C_{i2}\theta_{i2}c_{i2}{}^{\wedge} \ldots {}^{\wedge}C_{ik}\theta_{ik}c_{ik} = C_i\theta_ic_i \qquad (3)$$

which is a "representative" rule for the cluster of similar rules. For example, if the center of the cluster is (½, ½, ½), the following rule is generated:

$$C_1 = \tfrac{1}{2} {}^{\wedge} C_2 = \tfrac{1}{2} \Rightarrow C_3 = \tfrac{1}{2}.$$

Also, for totally ordered fields $C_{ij}$, standard deviations $\sigma_{ij}$ of the points in that cluster are calculated for that field. For unordered categorical fields $C_{ij}$, a measure of the "deviation" of the points is determined in that cluster along the j-th dimension from $c_{ij}$ (by using the hierarchical classification for that field).

In step 190, a total number of clusters generated in Step 165 is provided to the user. In step 195, the user is asked if there are too many of the generated clusters for manually inspecting the aggregated rules (i.e., the number of generated clusters is greater than a predetermined number). If so, the generated clusters are compressed using a cluster compression process described in step 205. Thereafter, there is a smaller number of clusters (and corresponding aggregation rules per cluster). The user is asked again, in step 195, if there are too many generated clusters for the manual inspection of aggregated rules. If the number of clusters is smaller than the predetermined number, for each cluster $C_i$ obtained in step 165 or in step 205, a set of users corresponding to the points for that cluster is identified in step 210. Each point in a cluster corresponds to a first representative rule from the dynamic profile of the user, so that all of the users corresponding to the dynamic profile rules from that cluster can be identified. For example, $CUST\_ID_i$ is defined as a set of values $Cust\_ID_{ij}$ corresponding to the users corresponding to the rules of cluster $C_i$. A set of records ("$CUST_i$") from the CUST file corresponding to the users of that cluster is identified (i.e., having user ID values from the set $CUST\_ID_i$). Thus, $CUST_i = \{r | CUST(r) \text{ and } r.Cust\_ID \in CUST\_ID_i\}$.

The set of records $CUST_i$ form a set of points in m-dimensional space (where m is the number of fields in the CUST file). These points are separated into clusters using the same techniques as described in step 165. For each resulting cluster $CUST_{ij}$, a center is located as explained below. The set of points belonging to that cluster is approximated with a logical statement having the form:

$$A_1\theta_{ij1}b_{ij1}{}^{\wedge}A_2\theta_{ij2}{}^{\wedge} \ldots {}^{\wedge}A_m\theta_{ijm}b_{ijm} \qquad (4)$$

to form a corresponding condition in step 215, where $A_i$ are the fields of the CUST file, $\theta_{ij1}$ are relational operators (e.g., "=", "<", ">", etc.) and $b_{ij1}$ are constants. One way to construct the condition (4) would be by finding the center $b_{ij} = (b_{ij1}, \ldots, b_{ijm})$ of the cluster $CUST_{ij}$ as described in step 180, and substituting the values of $b_{ij1}$ into the condition (4) (also setting all the relational operators to be "="). Another way to construct this condition (4) is described in A. Motro, "Using Integrity Constraints to Provide Intentional Answers to Relational Queries", Proceedings of the 15th International Conference on Very Large Databases, 1989, pp. 237-246, and C. Shum et al., "Implicit Representation of Extensional Answers", Proceedings of the 2nd International Conference on Expert Database Systems, 1988.

In step 220, the first and second representative rules are augmented (i.e., expression (4) is augmented with expression (3)). The resulting rule is:

$$A_1 \theta_{ij1} b_{ij1} \wedge A_2 \theta_{ij2} \wedge \ldots \wedge A_m \theta_{ijm} b_{ijm} \wedge C_{i1} \theta_{i1} c_{i1} \hat{C}_{i2} \theta_{i2} c_{i2} \ldots \hat{C}_{ik} \theta_{ik} c_{ik} = C_{im} \theta_{im} c_i. \quad (5)$$

For example, assume that the center of a cluster is a rule: "if a user shops in the evening on weekdays and buys diapers, the user also buys beer" (i.e., IF Shopping_time="evening" and Day_of_week="weekday" and Purchase="diapers" THEN Purchase="beer"). Also, assume that most of the users in that cluster are men, thus forming the expression (4) where "Sex"="Male". Accordingly, the augmented rule is "if a male user shops in the evening on weekdays and buys diapers, the user also buys beer" (i.e., IF "Sex"="Male" and "Shopping_time"="evening" and "Day_of_week"="weekday" and "Purchase"="diapers" THEN "Purchase"="beer").

Then, in step 225, the rules of the form (5) generated in step 220 are converted into fuzzy aggregated rules. In particular, each field $A_i$ and $C_{ij}$ in the form (5) is mapped into a corresponding fuzzy linguistic variable associated with that field. In addition, all of the terms in the expression (5) are converted into appropriate fuzzy expressions. For example, assume that a non-fuzzy term $A_1=20$ corresponds to a fuzzy linguistic variable also denoted as $A_1$. Further assume that the term set for $A_1$ is either low or high, and that there is a membership function that assigns the membership value (e.g., between 0 and 1) to each value from the domain of fuzzy term $A_1$ for each value from the term set. Then, it can be determined for which term (i.e., low or high) the membership value 20 is higher, and a corresponding term is assigned. If the membership value is higher for the term "low", then the expression $A_1=20$ is replaced by $A_1=\text{LOW}$.

In step 230, the set of aggregated fuzzy rules generated by the rule compression process is shown to the human expert who selects only the meaningful and useful rules from this set according to user desired criteria.

C. Cluster Compression Process

Figure 5:
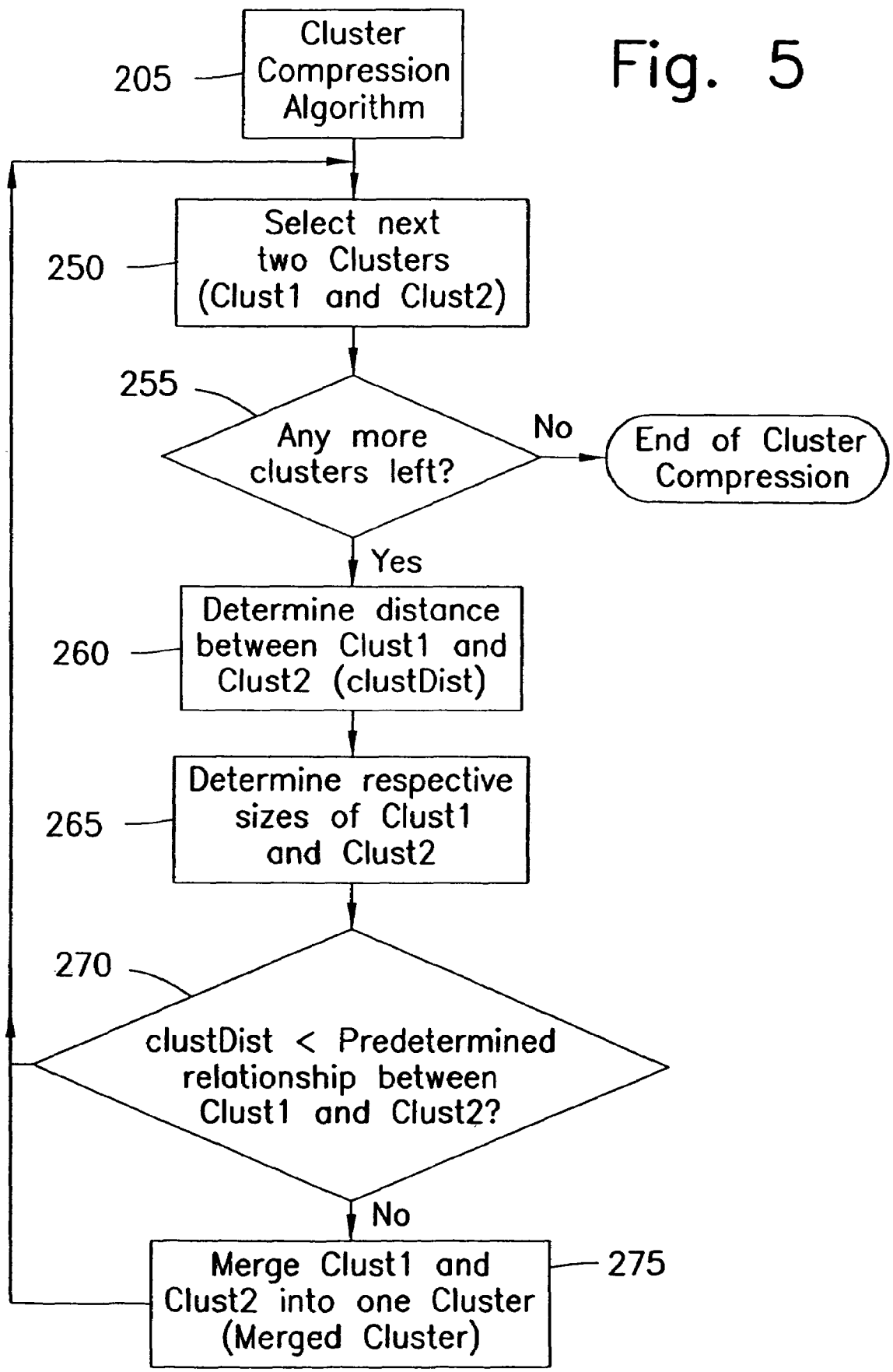
FIG. 5 shows a detailed flow diagram of an exemplary cluster compression process according to the present invention.

FIG. 5 shows an exemplary cluster compression process as discussed above with respect to step 205 illustrated in FIG. 4. As an initial matter, it is assumed that, e.g., clusters $\text{Clust}_1$ and $\text{Clust}_2$ are determined in step 165. Since $\text{Clust}_1$ and $\text{Clust}_2$ can be generated by dissimilar rules, the rules from each of these clusters $\text{Clust}_1$ and $\text{Clust}_2$ can be very different (or similar). Therefore, it is important to determine whether two different clusters are substantially similar to each other so that they can be merged. In particular, the distance between two aggregated rules of the form (3) corresponding to the centers of these clusters is determined to ascertain whether these different clusters are substantially similar. As an example, the following two aggregated rules corresponding to the center of $\text{Clust}_1$ and $\text{Clust}_2$ are considered:

$$C_1 = a \wedge C_2 < b \Rightarrow C_4 = c, \text{ and}$$

$$C_1 = d \wedge C_3 = e \Rightarrow C_4 = g$$

It may be also assumed that the domains of attributes $C_2$ and $C_3$ are discrete and ordered. These rules have different structure and therefore are different. In order to calculate the distance between these rules, we first have to bring these rules into the same 4-dimensional space of attributes $C_1$, $C_2$, $C_3$, and $C_4$. This can be done by replacing these rules with the rules $$C_1 = a \wedge C_2 = z \wedge C_3 = x \Rightarrow C_4 = c \quad (6)$$

$$C_1 = d \wedge C_2 = y \wedge C_3 = e \Rightarrow C_4 = g \quad (7)$$

where x and y are uniformly distributed random variables ranging over the domains $\text{Dom}(C_3)$ and $\text{Dom}(C_2)$ of attributes $C_3$ and $C_2$ respectively and z is a uniformly distributed random variable ranging over the domain of $\text{Dom}(C_2)$ from its smallest element to b. This procedure can also be performed using actual distribution in the data for corresponding attributes of x and y variables. It should be noted that the term $C_2 < b$ (the first aggregated rule described above) should be replaced with $C_2 = z$ in rule (6). In addition, term $C_3 = x$ is provided into the first aggregated rule and term $C_2 = y$ is provided into the second aggregated rule. It is also assumed that, e.g., random variables x, y, and z are uniformly distributed over their respective domains.

If constants are substituted for the variables x, y, and z, the terms of the aggregated rules (6) and (7) will contain only equalities and constants. Thus, these aggregated rules (with the above-described substitutions) will have respective points in the same 4-dimensional space. If the distance between these two points can be calculated for fixed values of variables x, y, and z—$d(\text{Clust}_1(x,z), \text{Clust}_2(y))$ (i.e., if all the attributes are numeric, then the distance can be a Euclidean distance; if some of the attributes are categorical and unordered, the distance can be calculated in terms of how far the nodes are in the aggregation hierarchy defined for that attribute)—then the distance between clusters $\text{Clust}_1$ and $\text{Clust}_2$ is equal to:

$$d(\text{Clust}_1, \text{Clust}_2) = \frac{1}{\text{Dom}(C_2) * \text{Dom}(C_3) * (b - \min(\text{Dom}(C_2)))} * \sum_{x \in \text{Dom}(C_3), y \in \text{Dom}(C_2), z < b} d(\text{Clust}_1(x, z), \text{Clust}_2(y))$$

since it can be assumed that the domains of attributes $C_2$ and $C_3$ are discrete. If these domains were continuous, integration would have been used instead.

In general, let $c_1 = (c_{11}, c_{12}, \ldots c_{1k})$ and $c_2 = (c_{21}, c_{22}, \ldots, c_{2m})$ be the centers of two clusters $\text{Clust}_1$ and $\text{Clust}_2$ as calculated in steps 170 through 185 illustrated in FIG. 4, where $c_1$ and $c_2$ are vectors with different dimensions (because different rules can have different numbers of terms). The rules corresponding to the centers of these two clusters are extended with, e.g., dummy attributes and dummy random variables that form a union of the attributes for clusters $\text{Clust}_1$ and $\text{Clust}_2$. Assuming that the dummy variables are uniformly distributed over their domains, the distances between the two rules for fixed values of random variables can be calculated. Thereafter, the random variables are either integrated (for continuous random variables) or summed (for discrete random variable) over different values of these random variables. Thus, the distance between clusters can be determined using the system and method according to the present invention.

Once the distance between the two clusters is determined, the clusters can be merged as follows. In order to perform this operation, the size of the cluster should be determined as a part of the Cluster Compression process. The size of the cluster is the measure of how far the points of the cluster are apart from each other. This size can be determined, e.g., using the following formula:

$$\text{size}(\text{Clust}) = \frac{1}{|\text{Clust}|} \sum_{x \in \text{Clust}} d(x, c)$$

where c is the center of the cluster. Other measurements can also be used by those having ordinary skill in the art.

The flow diagram in FIG. 5 illustrates an exemplary process for compressing clusters. In particular, two clusters Clust$_1$ and Clust$_2$ are selected in step 250. There are a number of ways to determine which clusters should be selected in step 250. The simplest way to select the clusters is in an arbitrary manner. In step 260, the distance between the clusters is determined, as discussed above. In step 265, the respective size of each cluster is determined. In step 270, a check is performed to determine if the distance between the clusters {d(Clust$_1$, Clust$_2$)} is smaller than the sizes of these clusters (e.g., to determine if these two clusters are "close enough" to each other). If so, the clusters should be merged into one cluster in step 275; otherwise, the clusters are maintained as separate clusters. In particular, an inquiry as to whether two clusters are "close enough" can be computed in the following manner, e.g.:

$$\frac{2*d(Clust_1, Clust_2)}{\text{size}(Clust_1) + \text{size}(Clust_2)} < \alpha \tag{8}$$

where α is a predetermined threshold value. The two clusters should be merged by forming a new cluster consisting of points from Clust$_1$ and Clust$_2$ if condition (8) occurs. Steps 250-275 should be repeated until there are no more clusters left that can be merged (see step 255).

In deciding which clusters Clust$_1$ and Clust$_2$ should be chosen in step 250 of the cluster compression process, distances between, e.g., all pairs of clusters can be calculated and condition (8) can be checked to ascertain which clusters should be merged. Other methods to select the clusters for compression can also be used. Furthermore, the distance between all the pairs of clusters does not necessarily have to be calculated.

The system according to the present invention can be used in a Personal Shopping Assistant (PSA), a Personal Intelligent Digital Assistant (PIDA), and in a dynamic Web content presentation system, described below.

Figure 6A:
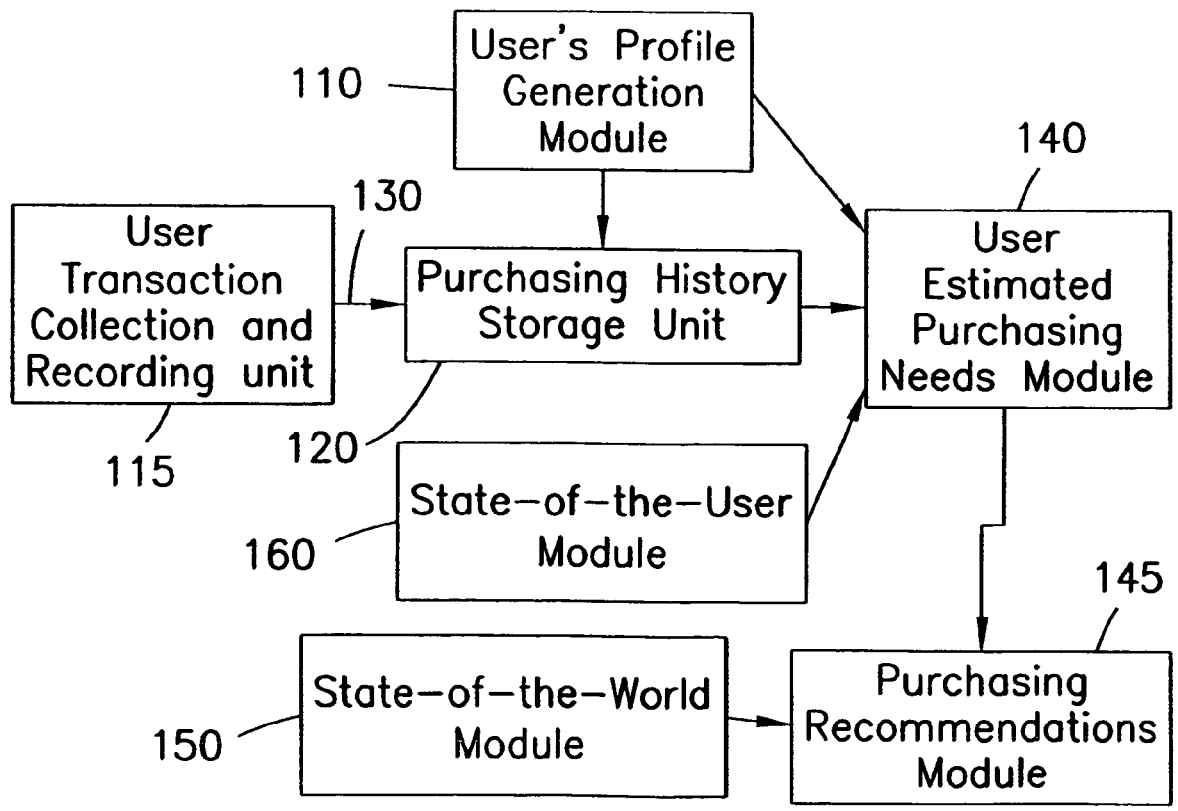
FIG. 6a shows an exemplary system for generating user profiles according to the present invention.

A Personal Shopping Assistant (PSA) system according to the present invention provides recommendations on the products and services that its users should consider purchasing (including, e.g., suggestions for purchasing at a specific source, and at a particular price). An exemplary embodiment of the PSA system according to the present invention is shown in FIG. 6a. In particular, the system includes a User Transaction Collection and Recording Unit (or module) 115, a Past Purchasing History Storage Unit (or module) 120, a User Profile Generation module 110, a State-of-the-World module 150, a User Estimated Purchasing Needs module 140, a Purchasing Recommendations module 145, and the State-of-the-User module 160.

The User Transaction Collection and Recording Unit 115 collects most of the shopping transactions performed by the user (e.g. 80-90% of all the purchases made by the user). The User Transaction Collection and Recording Unit 115 can be implemented as a "smart card," or as a smart Point of Sales register that records individual items purchased by the user. Alternatively, the user himself can record this information (as part of the User Transaction Collection and Recording Unit 115) using some transaction recording systems such as Quicken or Microsoft's Money.

When the user purchases one or more products, the User Transaction Collection and Recording Unit 115 records and transmits this information to the Purchasing History Storage Unit 120 where this information is stored as part of the purchasing history of the user. The Purchasing History Storage Unit 120 can be implemented, e.g., as a database that records transactions performed by various users in the TRANS file, as described above.

Information stored by the Purchasing History Storage Unit 120 is provided to User Estimated Purchasing Needs module 140. In order to estimate the user's purchasing needs, pertinent static and dynamic profiles of the user should be constructed based on the past purchasing histories obtained from the Purchasing History Storage Unit 120, which is performed by the User Profile Generation module 110. Static profiles include the user's demographic information (e.g., age, sex, marital status), particular preferences (e.g., user prefers a particular brand of beer), and certain purchasing decisions (e.g., the user bought a particular automobile in a particular month). Dynamic profiles include a set of rules (e.g., "if a user goes to France, the user often buys perfumes in Paris", "if user Y visits a Web site from the site Z in the evening, user Y does not spend a predetermined amount of time at site Z", etc.).

In addition, the PSA system maintains information on the current State of the World using the State-of-the-World module 150, which records information, e.g., on a broad range of products and services offered by various suppliers and on promotions and discounts run for these products and services. Also, the PSA system includes the State-of-the-User module 160 that maintains information about the user obtained from the Purchasing History Storage Unit 120 (e.g., the user will be in New York on Jun. 28, 1995 because she purchased an airline ticket for that date and destination) and various external information (e.g., the date, time, and the user's location, if available).

By knowing the purchasing history of a user (provided from the Purchasing History Storage Unit 120), the user's profile (provided from the User Profile Generation module 110), and the external information about the user (provided from the State-of-the-User module 160), the PSA system estimates the user's future purchasing needs using the User Estimated Purchasing Needs module 140. This Estimated Purchasing Needs module 140 may match the rules specifying which products the user will buy (and when) with the user's purchasing history. As a result, a set of products that the user should consider buying is produced.

Once future purchasing needs are estimated in Step 140, the PSA system will match these needs against a broad range of products and services offered by various suppliers and on the promotions and discounts run for these products and services. This matching process is performed by the Purchasing Recommendation module 145 using conventional methods that are known to those of ordinary skill in the art. For example, if the user needs to buy a pair of jeans within the next two months, the Purchasing Recommendations module 145 selects the merchants selling jeans, e.g, the cheapest pair of jeans that fits the use's requirements (considering the promotions offered within the next two months) by matching to the user profile (i.e., the user's purchasing needs). Once the Purchasing Recommendations module 145 matches the user's purchasing needs against the products and services, the Purchasing Recommendations module 145 provides purchasing recommendations to the user.

For example, based on the past purchasing history of a particular user, the PSA service may ascertain that whenever user X goes to France, user X often buys perfume in Paris. This rule is stored as a part of the user profile using the User Profile Generation module 110. In addition, the Purchasing History Storage Unit 120 of the PSA service may receive information that the user has purchased a ticket to Paris, and in a substantially same time period, the State-of-the-World Unit 150 of the PSA service also receives information that, e.g., Christian Dior has launched a new line of perfumes that is similar to the brands previously purchased by user X. In addition, the State-of-the-World Unit 150 may also receive information that the duty-free shop at Charles de Gaulle airport is having a sale on these new perfumes (the price being very competitive). Using the above-described exemplary information, the PSA service (using the User Estimated Purchasing Needs module 140) estimates that user X may want to buy these perfumes and sends a message to user X (via the Purchasing Recommendation module 145) to consider purchasing the new perfume at the duty-free shop at Charles de Gaulle airport.

The success of the PSA service depends primarily on accurate predictions by the PSA service of users' future needs. If the user finds, e.g., 50% of the PSA suggestions useful, the user will probably be satisfied with the PSA service. However, if the user finds, e.g., only 10% of the suggestions to be useful, the user will, most likely, reject this service. As indicated above, in order to make predictions of the user's future needs more accurate, it is important to build reliable user profiles. The present invention provides a method and system for generating better dynamic profiles and, therefore, providing more accurate predictions of the users' future needs.

Figure 6B:
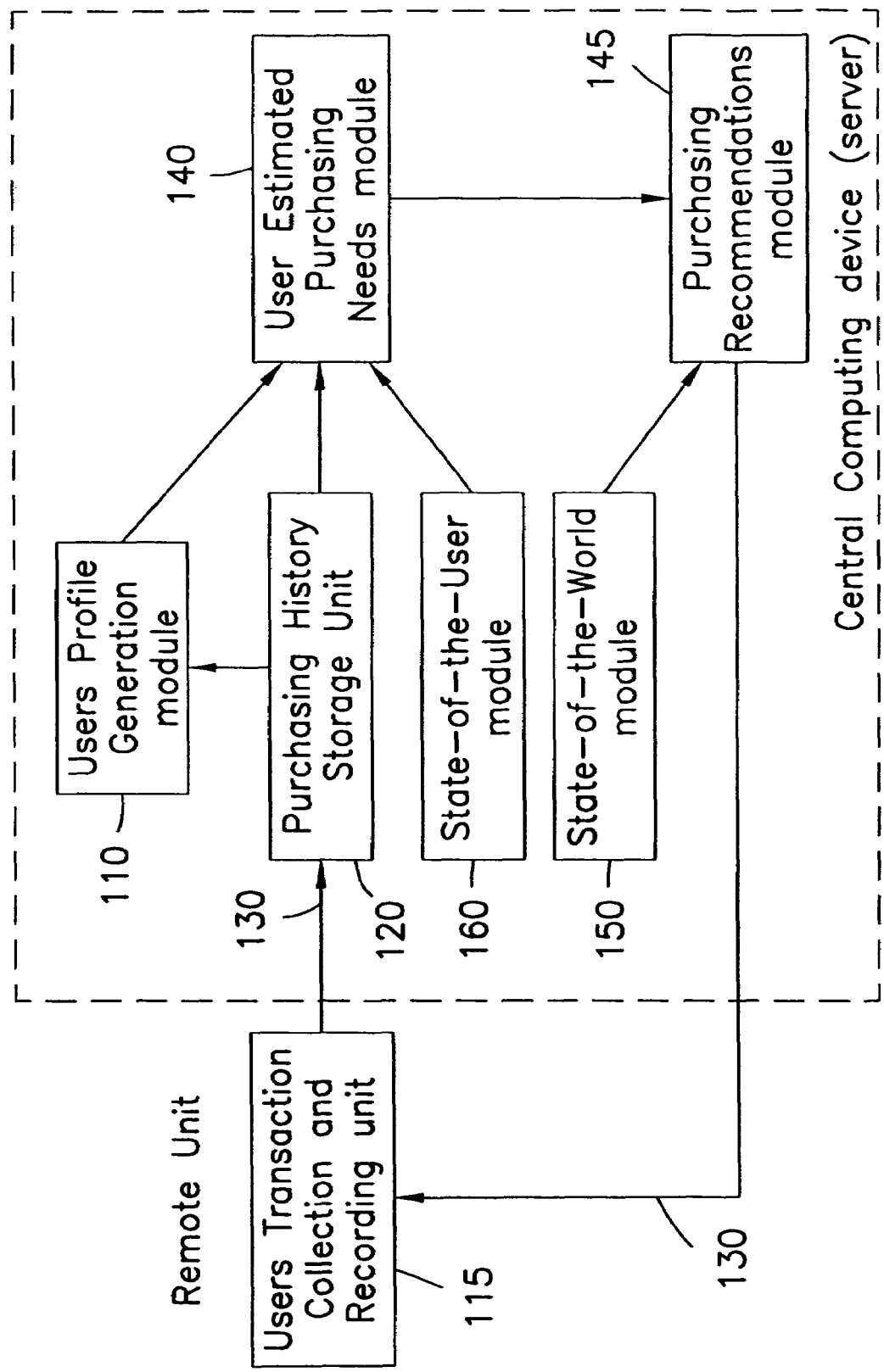
Figure 6C:
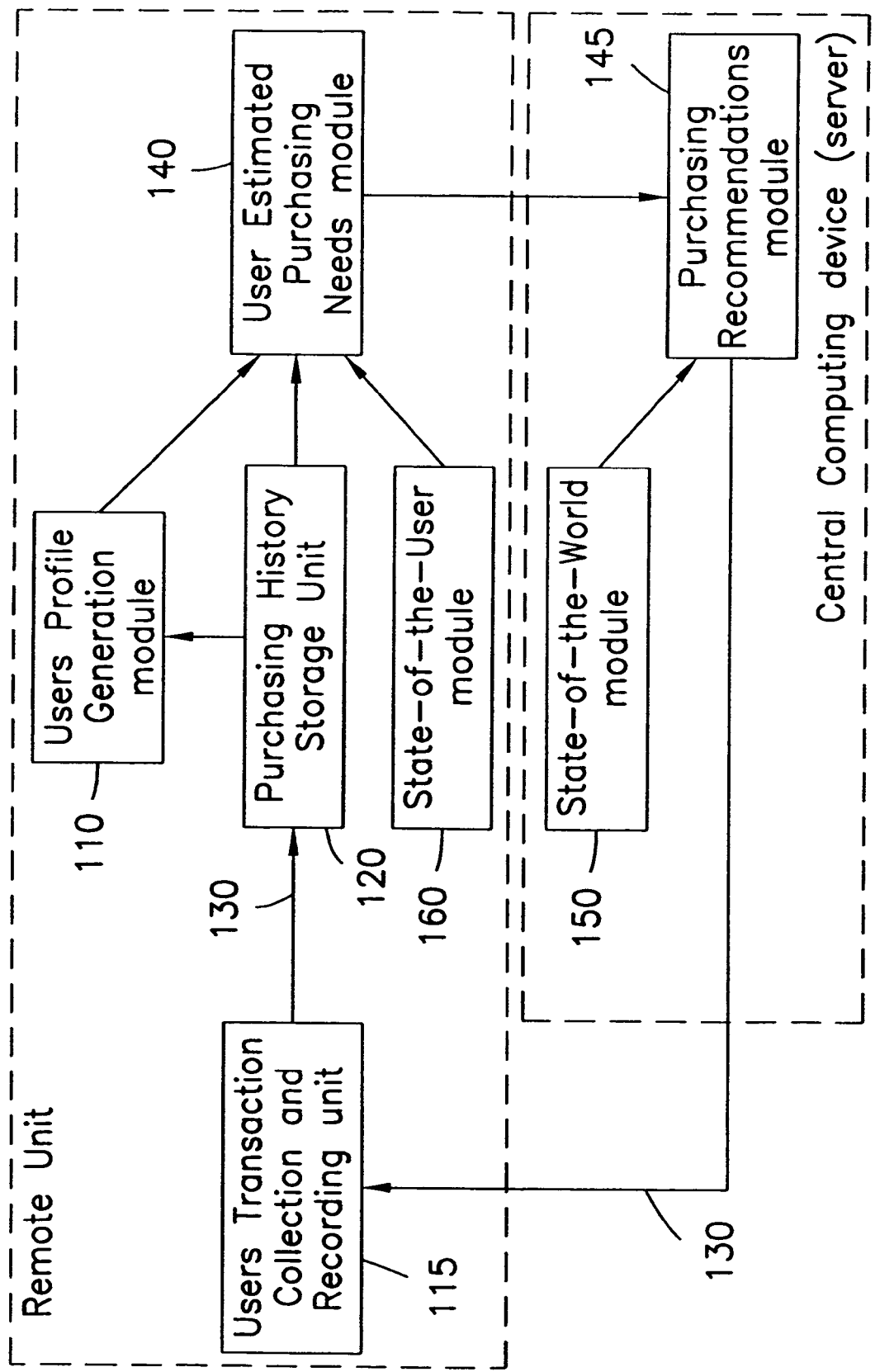

The PSA system illustrated in FIG. 6a can be implemented using a first exemplary system shown in FIG. 6b and a second exemplary system shown in FIG. 6c. The first exemplary system of FIG. 6b provides that the User Transaction Collection and Recording Unit 115 is stored on the client side. All other modules from FIG. 6a are stored on the server side and are connected to the User Transaction Collection and Recording Unit 115 via a Telecommunication Medium 130 (e.g., a telephone line or a wireless communication medium). In the first exemplary system, individual user purchasing histories and static and dynamic profiles of these users are stored on the server at a central location (e.g. a database), and the method and system according to the present invention (as described above) generates improved dynamic profiles, and thus provides better estimated purchasing needs of the users.

The second exemplary system of FIG. 6c provides that the User Transaction Collection and Recording Unit 115, the User's Profile Generation Module 110, the Purchasing History Storage Unit 120, the State-of-the-World module 150, the State-of-the-User module 160, and the User Estimated Purchasing Needs module 140 are stored on the client side, while the State-of-the-World module 150 and the Purchasing Recommendations module 145 are stored on the server side. In the second exemplary system, the user dynamic profiles are validated in Step 20 of FIG. 2 by the user (since these profiles are stored on the client side and are available to the user for checking and validating). Once module 140 estimates user purchasing needs, these estimated user purchasing needs are transmitted via the Telecommunication Medium 130 (e.g., a telephone line or a wireless communication medium) to the server, where the estimated user purchasing needs are matched by the Purchasing Recommendation module 145 to various products and services offered by various suppliers (that are stored on the server side). The resulting purchasing recommendations are transmitted back to the client side via the telecommunication medium 130 for the user's consideration.

Figure 7:
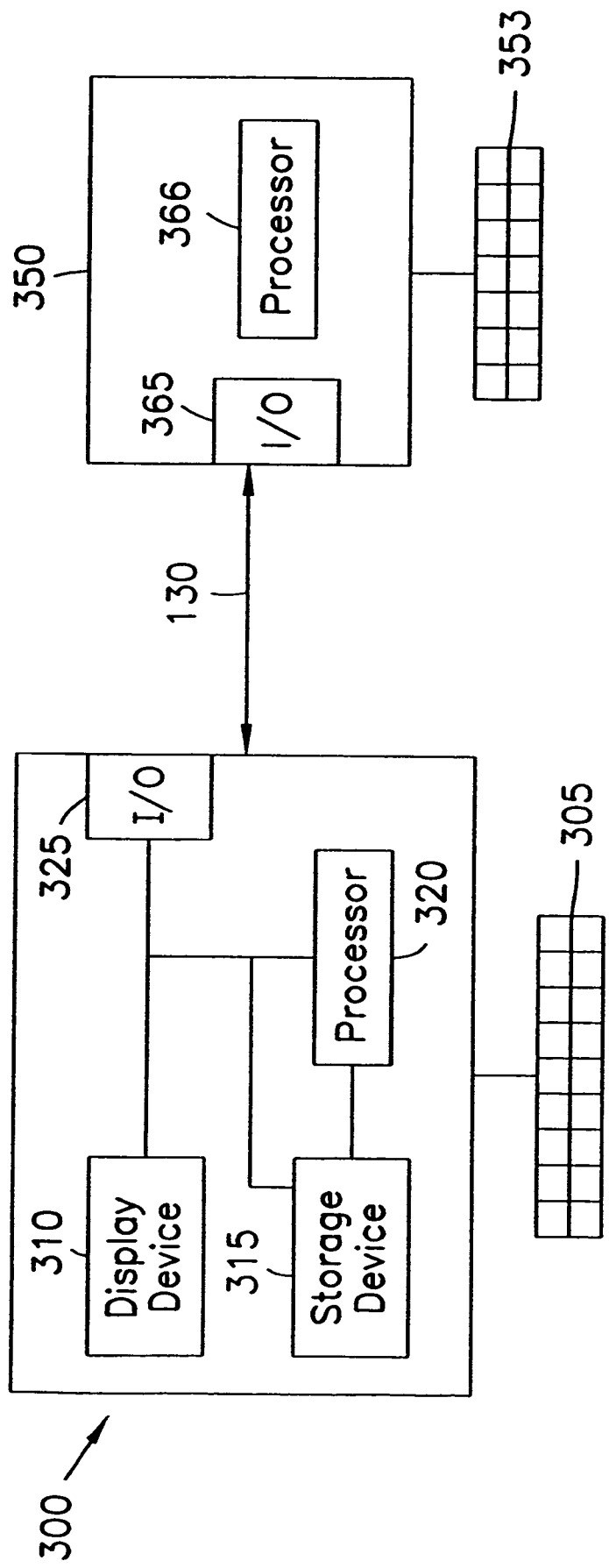
FIG. 7 shows a block diagram of an exemplary Personal Intelligent Digital Assistant system according to the present invention.

The PSA service can also be used in a Personal Intelligent Digital Assistant (PIDA) service as illustrated in FIG. 7. Each user subscribing to this additional service is provided with a Personal Digital Assistant (PDA) (e.g., the remote device 350 or the User Transaction Collection and Recording Unit 115), which is connected to the PSA system (e.g., a general purpose computer 300). The PDA remote device(s) 350 (which includes, e.g., a PDA processor 360, a PDA I/O port 365 and a PDA input device 355) and the PSA system(s) 300 (which includes, e.g., a display device 310, a storage device, a PSA processor 320, a PSA/ I/O port 325 and a PSA input device 305) form a client-server architecture, in which the PDA remote device is a client and the PSA system is a server. The PSA system, using the Past Purchasing History Storage Unit 120 (e.g., a storage device 315) and the User Profile Generation module 110, the State-of-the-World module 150, the State-of-the-User module 160, the User Estimated Purchasing Needs module 140 and the Purchasing Recommendations module 145 (executed by, e.g., a processor 320) estimates users' future needs and behavior as described above. The PDA device accumulates additional information on the user's current state, such as the user's location information, preferences, and desires (e.g., the user is hungry now and wants to eat). This additional information is transmitted from the PDA device to the PSA system via the telecommunication medium 130 (e.g., a wireless network, fiber-optics communication system, telephone wired system, etc.) to be stored using the State-of-the-User module 160 (e.g., in the storage device 315) as part of the user's state and is used subsequently for estimating the user's purchasing needs.

For example, in order to illustrate how the PIDA service operates, assume that it is Tuesday, 11:30 am and that user X is driving in his car on I-87 in the Albany region on business, and that he indicated through his PDA device 350 that he wants to have lunch. The PDA device (350) records the current state of user X as "Tuesday, 11:30 am, presently driving in user X's car on I-87 in the Albany region, travel purpose is business, wants to have lunch." This information is sent from the PDA device 350 to the PSA system 300 via telecommunication medium 130. Based on user X's past purchasing history, the PIDA service recognizes that whenever user X is traveling on business, he likes to have light lunches at good quality restaurants and that he generally likes sea food. By examining user X's personal profile, and by matching the dynamic rule which provides that "whenever user X travels on business, he prefers light lunches at good quality restaurants", with user X's current state (user X is currently traveling on business), the PSA system 300 can predict that user X prefers a lunch at a good quality restaurant and he wants to eat light food. Next, the State-of-the-world module 150 of the PSA system 300 searches for highly rated seafood restaurants in the Albany region. If the PSA system 300 finds any such restaurant, user X is provided with restaurant choices (e.g., if more than one restaurant is located) by contacting user X's PDA device 350. If the PSA system 300 does not find first choice restaurants conforming to the user X's preferences, the PSA system 300 provides second choice restaurants to user X.

User needs are estimated based on purchasing history, the user's static and dynamic profiles and the current "state" of the user (sent to the PSA system from the PDA device). When the needs of the user are estimated (e.g. the user wants to buy a perfume in Paris, or wants to eat at a good seafood restaurant in the Albany region), they are matched with the current state of the "world." If the PIDA service finds good matches (e.g., Christian Dior perfumes are on sale at Charles de Gaulle airport in Paris, or that there is a good seafood restaurant in the Albany region serving special lunches and located very close to the user's current route), purchase recommendations are provided to the customer based on these matches. These recommendations are sent back from the PSA server 300 to the PDA device 350 via a telecommunication medium 130 (e.g., via e-mail or through another intelligent user interface).

The PIDA service incorporating the system and method according to the present invention can be used for notifying the users about various purchasing opportunities, both time sensitive (e.g., a particular sale will start next week) and spatial (e.g., if you need a new sweater, and sweaters you would probably like are on sale at the store near your work).

The system and method according to the present invention can also be incorporated in a Web site system. In conventional systems, when a user visits a particular Web site, the user usually sees the same contents, regardless of who the user is. Using the system and method according to the present invention (i.e., individual profiles for respective users), the dynamic Web content of the Web site presented to the user can be varied to conform to the dynamic profile of the user visiting the Web site. Furthermore, dynamic profile construction methods can also be used in fraud detection systems. In particular, a set of fraud detection rules can be dynamically generated for each user.

It should be noted that the use of the above-described rule compression process and the cluster compression process according to the present invention is not limited to a construction of user profiles. For example, these process can also be used for computing useful association rules in data mining applications, or in general compressing large sets of rules generated by data mining algorithms.

D. Selective Validation Procedure

Figure 8:
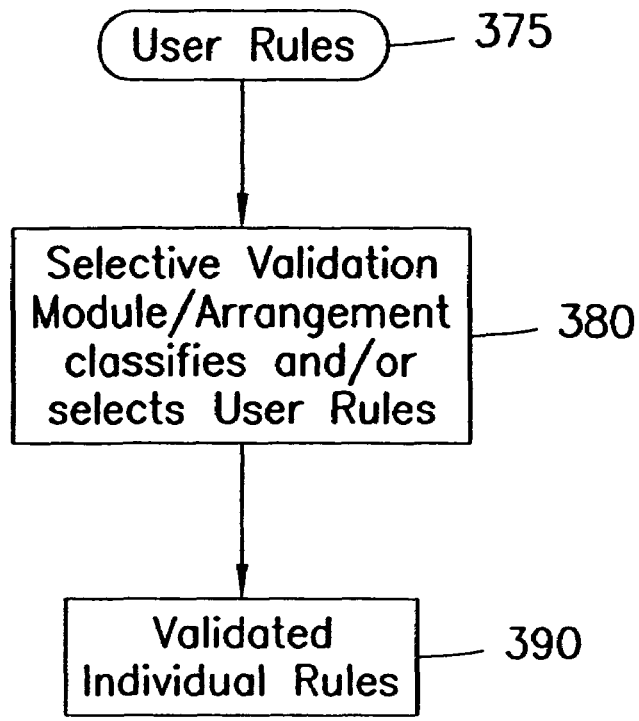
FIG. 8 shows a flow diagram of another embodiment of the process according to the present invention in which individual user rules are selectively validated using a selective validation module.

Another embodiment of the present invention for providing a selective validation of individual user rules is shown in FIG. 8. In particular, user rules for all individual users (e.g., customers) are provided to a selective validation module/arrangement (step 375). The selective validation module/arrangement can be preferably executed by a central computing device illustrated in FIGS. 6a and 6b, or executed by the processor 320 of the general purpose computer 300 illustrated in FIG. 7. The individual user rules may be stored in the storage device 315. It is also possible to provide the selective validation module/arrangement in the remote unit 350 illustrated in FIG. 7. In step 380, the selective validation module/arrangement receives still unvalidated user rules and outputs at least one set of selectively validated individual user rules (step 390). In addition, the selective validation module/arrangement can optionally include the process illustrated in FIG. 3. In an exemplary embodiment of the present invention, this selective validation procedure allows the human expert to select particular subsets of individual user rules and characterize these subsets as "Good" subsets, "Bad" subsets and/or "Undecided" subsets.

A flow chart representation of an exemplary embodiment of a process executed by the selective validation module (or an exemplary steps executed by the selective validation arrangement) described above is illustrated in FIG. 9. According to the present invention, a "Good_Rules" set is provided to maintain (e.g., store) all sets of individual user rules which were selected by the human expert as rules which are usable for a particular user. A "Bad_Rules" set is provided to store all sets of individual user rules selected by the human expert to be unusable for that user.

As shown in FIG. 9, (in step 400) each of the "Good_Rules" and "Bad_Rules" sets are initialized, e.g., to be empty or null sets. In step 405, all user rules are combined to form Set S. Set S initially contains all related (e.g., similar) subsets of the unvalidated individual user rules for all users. These similar subsets may be grouped in a similar manner as discussed above with reference to FIG. 4, or using a filtering and/or clustering operator as discussed below. In step 410, the user rules in Set S (or subsets in Set S) can be displayed. The human expert examines the subsets of "related" rules from Set S (e.g., one rule or one set at a time), and selects which subsets (or which rules) in Set S are "good", "bad" and/or neither (step 415). These subsets can also be examined automatically by a system (e.g., the processor 320 implementing an expert system or an artificial intelligence system) using a predetermined criteria. If a particular subset in Set S is selected to be usable, the particular subset is marked as "good"; if this subset is selected to be unusable, it is marked as "bad"; if the human expert (or the system) cannot determine if the particular subset is usable or not, such subset is marked as "undecided" (step 420). In step 425, the subsets which are marked as "good" are moved from Set S to the Good_Rules set, and the subsets which are marked as "bad" are moved from Set S to Bad_Rules set.

In step 430, a decision is made (e.g., automatically via the processor 320 or by the human expert) if the processing of the selective validation module/arrangement is completed, and, if so, initiates a completion process according to this embodiment of the present invention. There can be numerous conditions to indicate to the selective validation module/arrangement according to the present invention that the completion process should be initiated. For example, the following exemplary conditions may prompt the selective validation module/arrangement to stop processing:

Set S can became empty (i.e., all subsets of rules are moved from Set S to "Good_Rules" set and/or to "Bad_Rules" set). If this is the case, all subsets of rules are marked with their appropriate designation (i.e., "good" or "bad");

the number of subsets in Set S is less than a predetermined number;

the ratio of the rules in Set S with respect to all of the existing rules is less than predetermined value; and the user decides to stop the process (e.g., a desired number of rules has already been classified or marked).

Other stopping criteria may be used for initiating the completion process according to the present invention.

If it is determined that the processing of the completion process according to the present invention should be initiated, the rules from the Good_Rules set is assigned to one or more corresponding users (step 435), Good_Rules set and/or undecided subsets can be displayed (step 440), and the execution of the process according to the present invention is stopped. If, however, it is determined that the completion process should not be initiated (i.e., the subsets should be regrouped), the remaining rules in Set S (i.e., the subsets marked as "undecided") are grouped or regrouped to generate a new Set S (step 445), and this new Set S is provided to the human expert (i.e., looped back to step 410) so that the rules within new Set S may be reclassified using the process and/or the arrangement according to the present invention (i.e., looped again starting with step 410).

It should be noted that if a particular subset Set S is marked as "undecided", this subset is then further analyzed by either splitting it into smaller subsets using techniques described below or optionally regrouping this particular subset with other related sets from Set S as also described below.

According to an exemplary embodiment of the process according to the present invention, the rules in Set S which were marked as "undecided" are grouped to generate a new Set S according to the following exemplary methods:

A predetermined number of the remaining subsets (which can also be a single subset) contained in Set S are selected and merged together to form new subsets. The above-described remaining sets can be selected by the human expert or according to some predetermined selection criterion (e.g., the size of individual sets of rules should be smaller than a predetermined value).

One or more subsets are selected from Set S. For each of these subsets, at least one of the following exemplary "partitioning" operators is applied to the selected subsets: a filtering operator and/or a cluster/grouping operator (which are as described below). Other "partitioning" operators can also be implemented. The terms—"clustering operator" and "grouping operator refer to identical operations and shall be utilized interchangeably below. In a particular embodiment of the present invention, subsets in Set S (obtained using the cluster operator with a particular "cut" operator) can be re-grouped based on a different "cut" operator, which may depend from the previous cut and/or can be based on other parameters or criteria. For example, these subsets can be merged back into a single set of rules and the cluster operator is then applied to this subset again (but with a different "cut" parameter). Other operators can also be used to regroup the subsets in Set S.

I. Filtering Operators

An exemplary filtering operator receives a subset of rules and splits this subset into at least 2 subsets: one subset contains rules which pass a predetermined selection criteria of the filter, and another subset contains rules which do not. In particular, this selection criteria may be specified using a data mining query (or a pattern template). The data mining query describes a class of patterns in general terms.

Data mining queries are described in publications—T. Imielinski et al., "DataMine: Application Programming Interface and Query Language for Database Mining", Proceedings of the Second International Conference on Knowledge Discovery and Data Mining, August 1996; J. Han et al., "DMQL: A Data Mining Query Language for relational Databases", Proceedings of the SIGMOD Workshop in Research Issues on Data Mining and Knowledge Discovery, Montreal, June 1996; and W. Shen et al., "Metaqueries for Data Mining," Advances in Knowledge Discovery and Data Mining, chap. 15, AAAI Press, 1996. Any pattern description language or any data mining query language can be used to specify patterns and data mining queries. For example, article by T. Imielinski et al., "DataMine: Application Programming Interface and Query Language for Database Mining," Proceedings of the Second International Conference on Knowledge Discovery and Data Mining, August 1996 introduced "M-SQL" for association rule discovery which is based on software query language ("SQL") modified with additional data mining operators. However, the exemplary embodiment of the data mining query does not depend on any specific language.

For the following exemplary request, "Find all rules in customer purchase data specifying which product categories the customers with children of various ages are buying", M-SQL query is as follows:

SELECT *
FROM Mine(CustomerPurchaseData) R
WHERE R.Body<{(Children=*), (ChildrenAgeLess6=*), (ChildrenAge6to12=*), (ChildrenAgeMore12=*)} and {(Children=*)}<R.Body and R.Consequent IN {(CategorySweets=*), (CategoryCereal=*), (CategoryFruit=*)} and R.Confidence>=0.5 and R.Support>=0.01.

This data mining query discovers association rules if and only if they satisfy certain criteria. First, the association rules must include the fields Children, ChildrenAgeLess6, ChildrenAgre6to12, ChildrenAgeMore12 of the table CustomerPurchaseData in the body of the rule. Second, the attribute Children must necessarily be present (this is specified by R. Body). Third, the discovered patterns must have one of the fields CategorySweets, CategoryCereal or CategoryFruit as a consequent of the rule (specified by R.Consequent). Finally, the discovered patterns must satisfy certain thresholds measuring statistical significance (i.e., R.Confidence and R.Support).

Thus, this exemplary data mining query specifies a set of patterns. The set of these exemplary patterns may indicate:
the extent to which families with children younger than six years old buy sweets,
the extent to which families with children older than 12 years old buy sweets,
the extent to which families with children older than 12 years old buy fruit, etc.

Therefore, the pattern specified by the association rule:

Children=YES and ChildrenAgeLess6=YES--
<CategorySweets=YES (0.01, 0.55)

noted above is also one of the patterns specified by the data mining query.

Pattern Templates are described in M. Klemmettinen et al., "Finding Interesting Rules for Large Sets of Discovered Association Rules", Proceedings of the Third International Conference on Information and Knowledge Management, December, 1994. For example, a pattern template may be provided as follows:

Children and ChildrenAge*--<Category(0.01,0.5)

where ChildrenAge and Category are generalizations of attributes. Thus, if ChildrenAge specifies the set of attributes {ChildrenAgeLess6, ChildrenAge6to12, ChildrenAgeMore12} and Category specifies the set of attributes {CategorySweets, CategoryCereal, CategoryFruit}, then this pattern template specifies the same patterns as the above-described data mining query.

II. Clustering Operator

Figure 13:
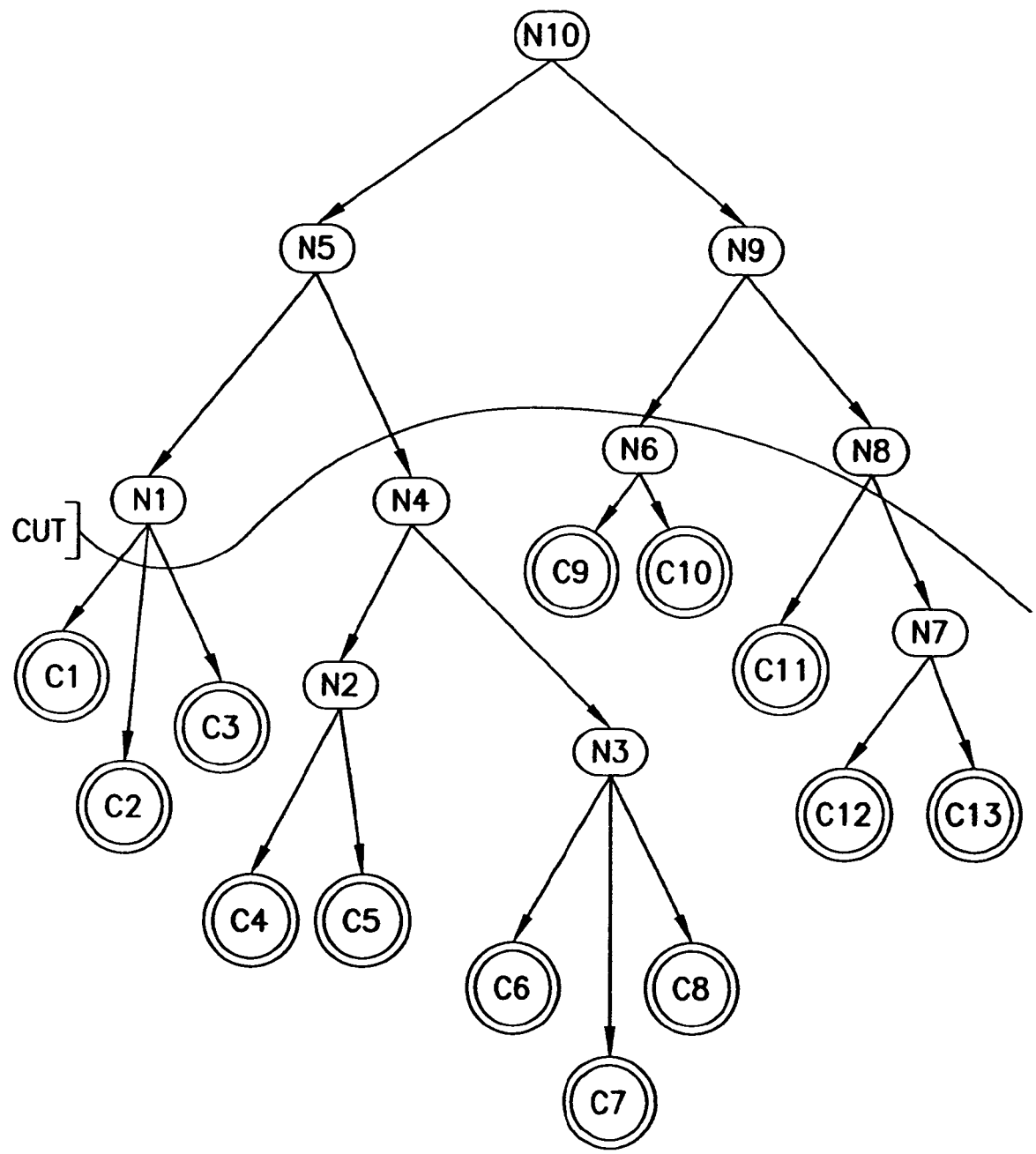
FIG. 13 shows an exemplary attribute hierarchy which can be utilized with this embodiment of the process and system according to the present invention.

The clustering operator receives, as input, a subset of rules and an attribute hierarchy of this subset. In particular, the attribute hierarchy can be formed using the procedure described below with reference with FIG. 10. An exemplary attribute hierarchy is illustrated in FIG. 13. All of the fields (i.e., attributes) of the attribute hierarchy are provided at the bottom of the attribute hierarchy. These fields are portions of the transaction file TRANS(Trans_ID, Cust_ID, $C_1, \ldots C_n$) as described above, without the fields Trans_ID and Cust_ID. In the exemplary hierarchy illustrated in FIG. 13, n=13.

Figure 10:
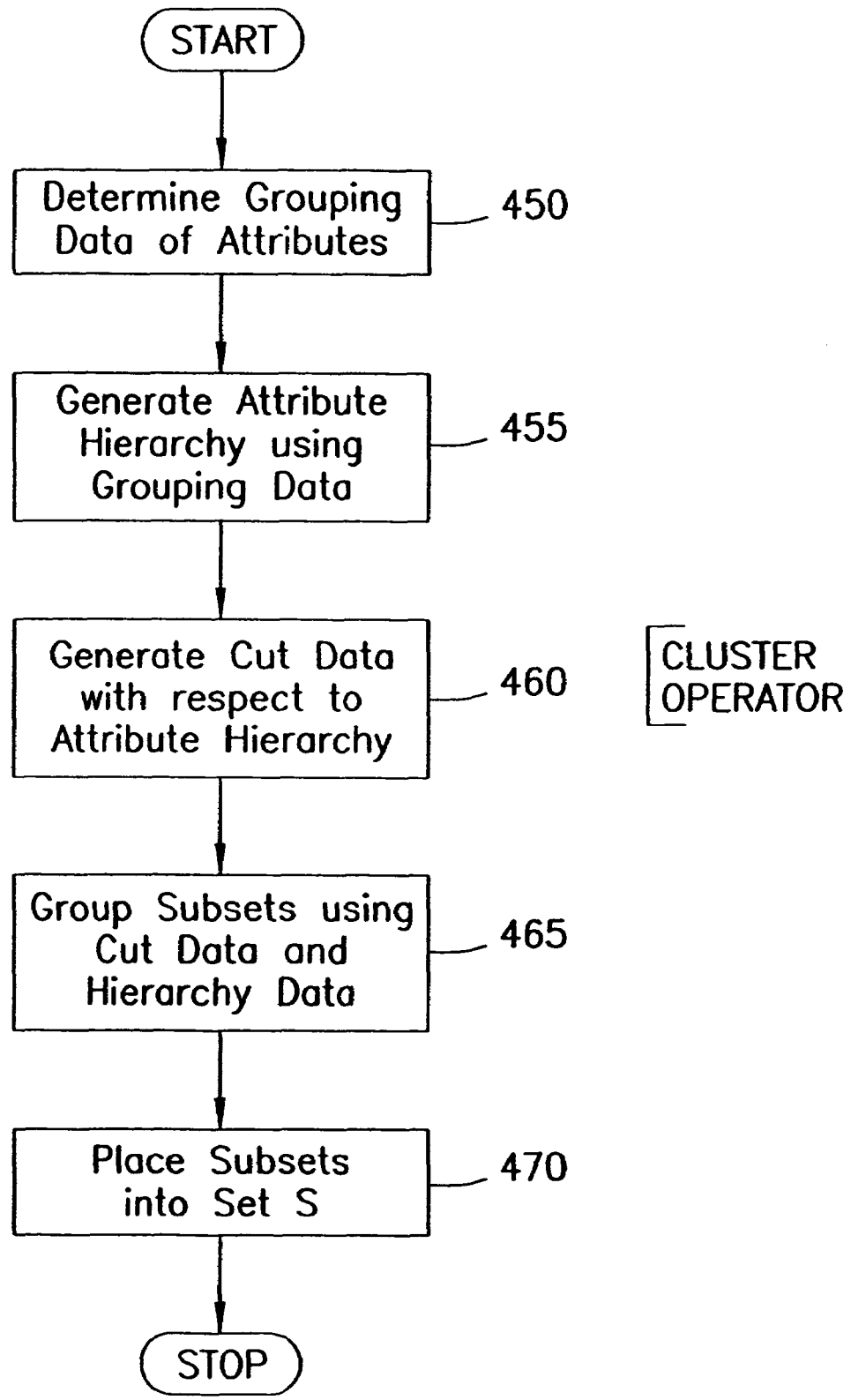
FIG. 10 shows a flow diagram of an exemplary procedure to generate the attribute hierarchy and to provide a cluster operation.

A top portion of FIG. 10 shows an exemplary procedure to generate the attribute hierarchy. In step 450, grouping data of a particular subset of rules is determined by combining the fields of the TRANS file (e.g., a table) into groups (e.g., fields C1, C2, C3 illustrated in FIG. 13 are combined into group N1, fields C4 and C5 into group N2, etc.). In step 455, these groups are further combined into larger groups, and so on. For example and as shown in FIG. 13, groups N2 and N3 are combined into group N4, groups N1 and N4 are combined into group N5, fields C9 and C10 are combined into group N6, group N7 and field C11 are combined into group N8, groups N6 and N8 are combined into N9, and groups N5 and N9 are combined into N10. As a result, the attribute hierarchy is generated (step 455), with attributes of the TRANS transaction file being its leaves. It should be noted that a tree which defines this attribute hierarchy (shown in FIG. 13) does not have to be balanced, i.e., all path lengths from the root node to the leaves do not have to be equal.

Figure 14:
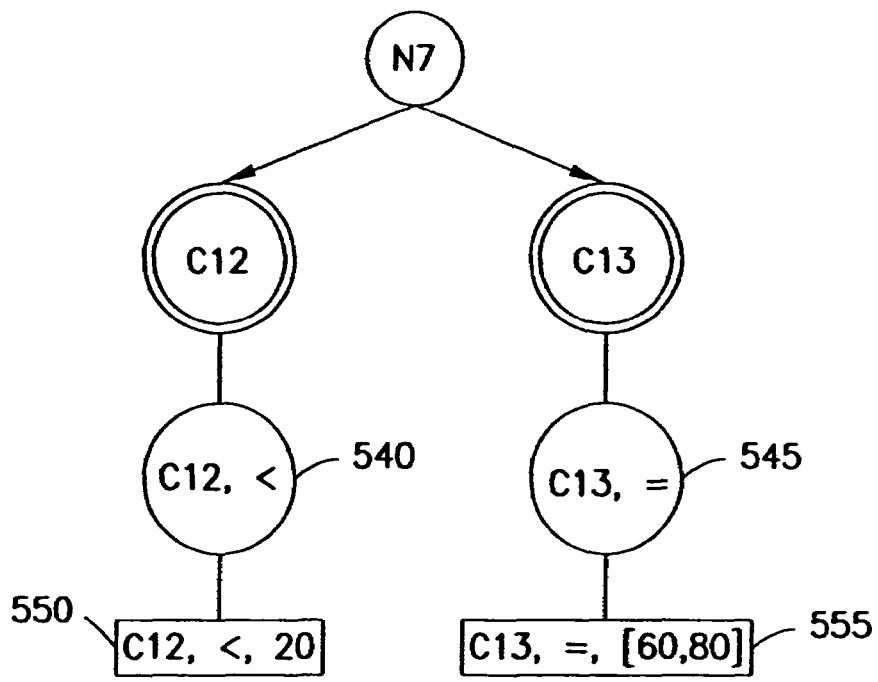
FIG. 14 shows an exemplary illustration of a first level extension and a second level extensions of an exemplary node/group illustrated in FIG. 13.

The attribute hierarchy may include one or more (e.g., two) levels of nodes below the descendent leaves of the attribute hierarchy (i.e., the fields of the TRANS transaction file). A first level consists of a pair of attributes—field and a relational operator. The relational operator may include exemplary operators such as "=", "<", ">", etc. A second level is below the first level and consists of three attributes—field, relational operator and sets of values which the field attribute can be compared to (e.g., predetermined values, one or more intervals, etc.). For example, the second level can be (C3, =, a) (i.e., field C3 uses the relational operator "=" to be compared to variable "a"), (C5, <, 20) (i.e., field C5, via the relational operator "<" is compared to number 20), (C8, =, [60, 80]) (i.e., field C8, via the relational operator "=" is compared to a range between 60 and 80), etc. FIG. 14 shows an exemplary illustration of the first and second level extensions of node N7. In particular, the first level of field C12 is a leaf 540, which contains field C12 and a relational operator "<". Below leaf 540, a lowest leaf of field C12 (leaf 550) is provided with field C12, the relational operator "<" and a comparison value "20". In addition, the first level of field C13 is a leaf 545, which contains field C13 and a relational operator "=". Below leaf 545, a lowest leaf of field C13 (leaf 555) is provided with field C13, the relational operator "=" and a comparison range "[60, 80]". These leaves are only provided for illustrative purposes, and it should be understood that other combinations of field to relational operators to comparison values/ranges are possible. These hierarchies don't necessarily have to include the same number of extensions/leaves. For example, field C12 may have two extensions, field C4 may have one extension, field C5 can have no extensions and field C6 can have four extensions.

Figure 11:
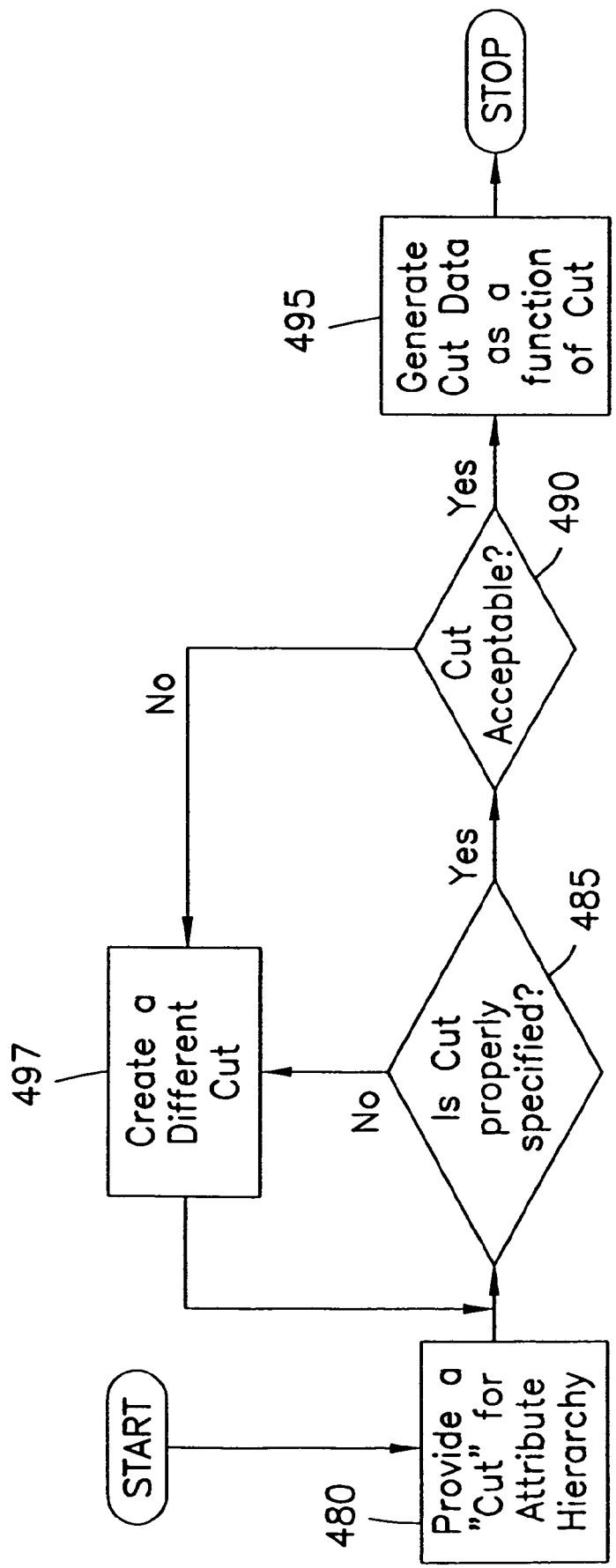
FIG. 11 shows a detailed illustration of an exemplary procedure to generate "Cut" data.

After the attribute hierarchy is generated in step 455 (shown in FIG. 10), "Cut" data is generated with respect to the attribute hierarchy (step 460) by providing a "Cut" in the attribute hierarchy. "Cut" in the attribute hierarchy is defined as a set of nodes of the tree such that a union of all descendant leaves of the nodes which were identified in the cut consists of all the fields of TRANS transaction file (i.e., $C_1, \ldots, C_n$). An exemplary cut is shown in FIG. 13 which includes the following groups/fields—C1, C2, C3, N4, N6, C11 and N7. In addition, the "Cut" is not limited to the nodes of shown in FIG. 13, and can also include one or two levels below the field levels (shown in FIG. 14). FIG. 11 shows a detailed illustration of step 460 in which "Cut" data is generated. In step 480, the "Cut" is provided to the attribute hierarchy. If the "Cut" is properly specified (e.g., all of the leaves of the attribute hierarchy are above the "Cut", leaves being the lowest level of the attribute hierarchy) in step 485, or if the human expert (or the system) indicates that the "Cut" is unacceptable (step 490), a different "Cut" is created using similar techniques as described above for providing the original cut (step 497) and the procedure is restarted at step 485 with this newly created "Cut". Otherwise, "Cut" data is generated as a function of the "Cut" (step 495) and can be stored in memory for a possible future use.

After the "Cut" data is generated (step 460 in FIG. 10), subsets of the user rules are grouped using "Cut" data and the hierarchy data (step 465), and these grouped subsets are placed into Set S (step 470) to be provided to the human expert.

Thus, the clustering operator consists of steps 460-470. As indicated above, the following data is provided as input to the clustering operator: a) initial set of user rules, b) an attribute hierarchy as described above, and c) the "Cut". The output of the clustering operator is Set S which includes subsets of rules. These subsets are mutually exclusive and collectively exhaustive (e.g., a union of the subsets is equal to all of the rules in Set S).

Figure 12:
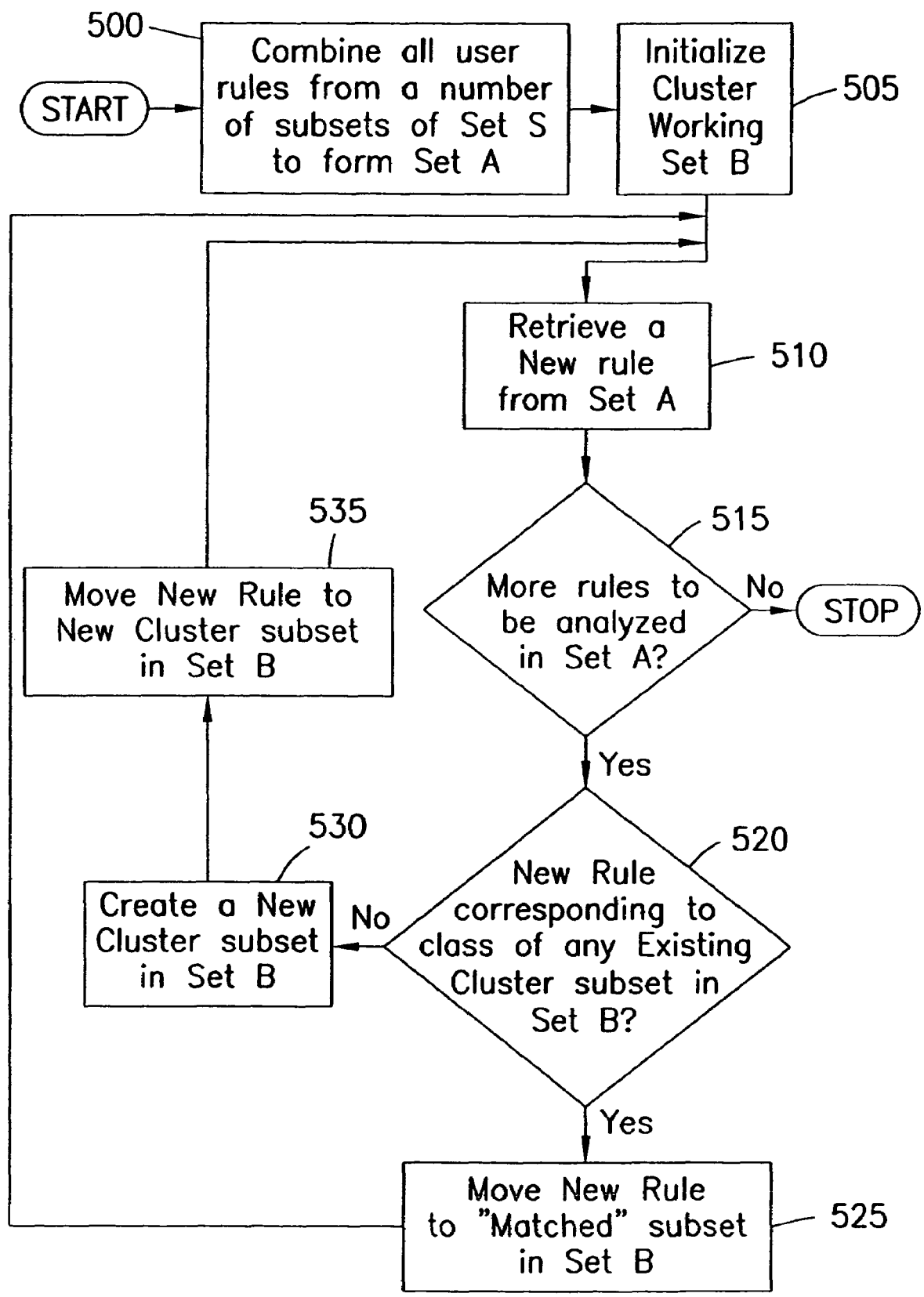
FIG. 12 shows an exemplary procedure for grouping subsets using the "Cut" data.

FIG. 12 shows an exemplary procedure for grouping subsets of the user rules using the "Cut" data as described for step 465 above (FIG. 10). In particular, all user rules are combined from a number of subsets of Set S to form Set A. In step 505, another set (i.e., a Cluster Working Set B) is initialized (e.g., to be an empty set or a null set). A new rule is then retrieved from Set A (step 510). In step 515, if there are no more rules in Set A to be analyzed or regrouped (e.g., Set A has no more rules or is a null set), the exemplary procedure shown in FIG. 12 is completed. Otherwise, in step 520, it is determined if the new rule corresponds to a class of any existing cluster subset in Set B. If that is the case, the new rule is moved into a "matched" subset in Set B (step 525) and the procedure is directed to step 510. Otherwise, a new cluster subset is created in Set B (step 530), the new rule is moved to the new cluster subset in Set B (step 535), and then the procedure is directed to step 510.

Using the "Cut", two rules are provided to the same class if and only if they have the same structure with respect to the "Cut". In particular, the rules should have the same number of attributes and these attributes, e.g., can be grouped in pairs so that two attributes in the same pair have the same ancestor in the "Cut". For example, the rules:

C1=5 and C4<6 and C9>8⇒C12=8 and

C1>3 and C6=5 and C10<2⇒C13<7 are equivalent because fields C4 and C6 (shown in FIG. 13) have group N4 as an ancestor in the "Cut", rules C9 and C10 have group N6 as an ancestor in the "Cut", and rules C12 and C13 have group N7 as an ancestor in the "Cut". It should be noted that the user rules in the same cluster are "equivalent". As such, a new rule retrieved from Set A can be compared with any rule (or a specific rule) in the related cluster subset in Set B in step 520 shown in FIG. 12. In addition and as shown in FIG. 13, the rules:

C2=4 and C9=5⇒C12=8 and

C2=8 and C11=3⇒C12=6 are not equivalent because fields C9 and C11 do not have a common ancestor in the "Cut". Accordingly, using the procedure shown in FIGS. 10 and 12, the subsets of rules of the generated clusters are provided into the set of regrouped rules generated in step 445 of FIG. 9.

After Set S is split into a subset of clusters, one or more statistics may be generated for each cluster. These statistics may be, e.g., the number of rules per cluster.

if a component of the rule is an attribute, the ranges of values that such attribute can assume. For example, if the attribute is "Age=a", then it may be preferable to collect statistics on the maximum and minimal values for the age in the rules for that cluster, in addition to the average value and standard deviation for that age.

for different nodes/groups, how many rules correspond to different attributes for each node/group. For example, for group N6 shown in FIG. 13, it is possible to maintain the number of rules with attribute C9 and the number of rules with attribute C10.

centers of clusters (calculated, e.g., with the method described above and illustrated in FIGS. 4 and 5). These centers can be reported to the human expert.

These exemplary statistics may be utilized by the human expert in step 410 (shown in FIG. 9) to determine which sets of rules the human expert may select for a manual examination. This completes the description of FIG. 9 and the way rules are examined by the human expert.

If the human expert determines that the clustering of rules based on a particular "Cut" is unsatisfactory, the rules may be regrouped in step 445 using a different "Cut". For example, this different cut would be a finer cut which generated a larger number of clusters (which are smaller in size). This can be done by merging back the clusters of rules obtained with the previous "Cut" (in step 445), returning to step 410 where the human expert marks all the merged rules as "undecided", and then, in step 445 again, re-cluster rules based on the different (e.g., finer) "Cut".

The process and system according to the present invention can be implemented using, e.g., a graphical user interface ("GUI") which enables the human expert to communicate with the validation system according to the present invention. Using this GUI, the human expert selects a number of operators from a graphical menu of the GUI. Exemplary operators provided on this graphical menu may include a "Filtering" operator, a "Clustering" operator and a "Browsing" operator (e.g., allows the human expert to examine sets of rules generated by the "Clustering" operator or another operator). Other operators can also be included in the graphical menu of the GUI.

Figure 15:
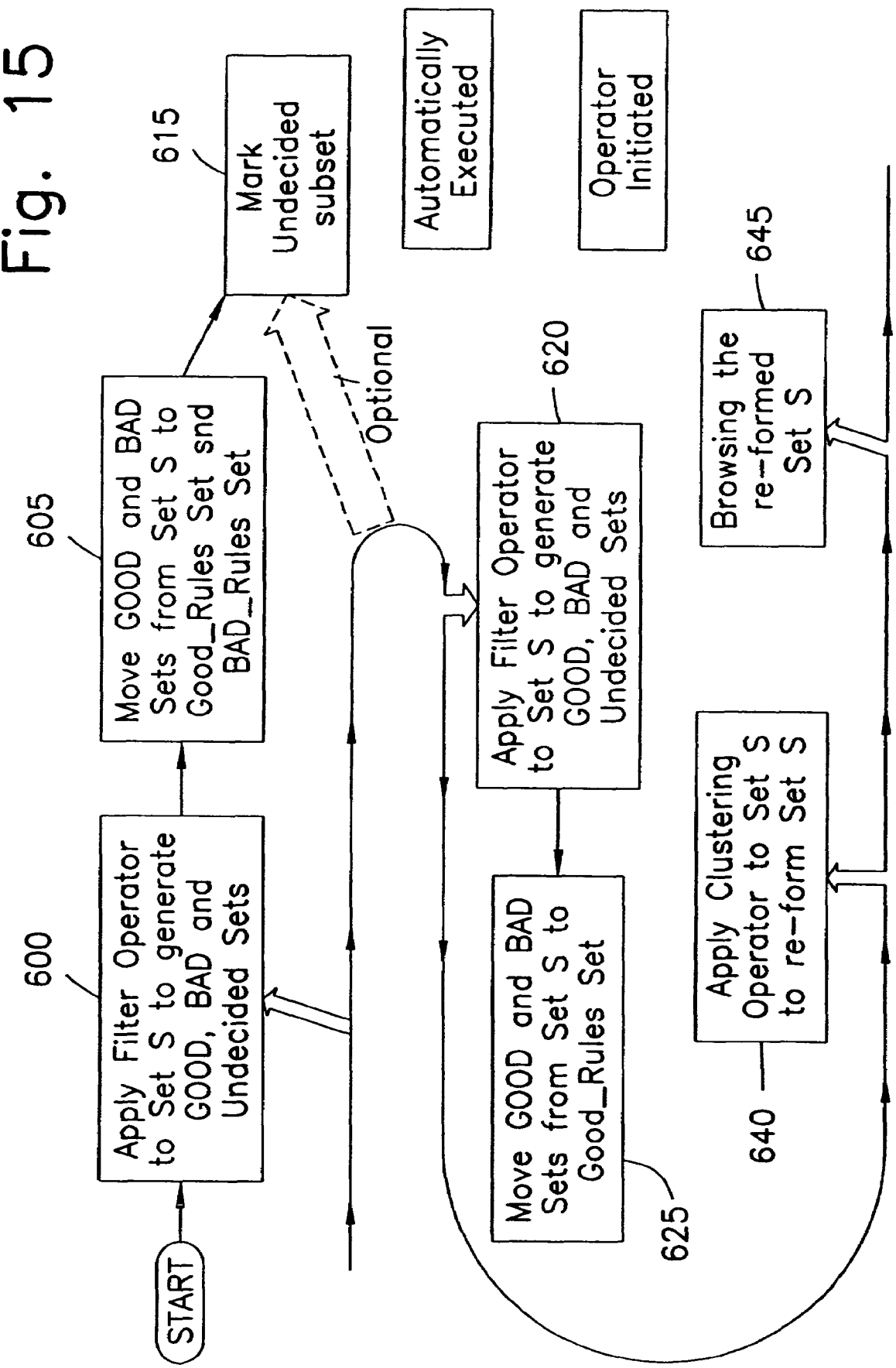
FIG. 15 shows an exemplary implementation of the process and system according to this embodiment of the present invention as illustrated in FIGS. 8 and 9.

FIG. 15 shows an exemplary flow of the process and system according to this embodiment of the present invention. In particular, the user (e.g., human expert) can select the "Filtering" operator from the graphical menu and apply this operator to Set S (step 600). As a part of the filtering operator, the human expert may specify a data mining query which selects "Good", "Bad" or "undecided" rules from Set S. Then, in step 605, "Good" rules are moved from Set S to "Good_Rules" set, and "Bad" rules are moved from Set S to "Bad_Rules" set which is, preferably, automatically saved by the system (e.g., the processor) into a memory device. In step 615, the system may mark the user rules which were determined by the user (or automatically by the system) as "undecided". In step 620, the human expert may apply the remaining "undecided" rules through another filter to again obtain "Good", "Bad" and "undecided" rules (which can be determined using another user-specified data mining query) from the rest of the rules. After the second "Filtering" operator is applied, the system may move "Good" rules from Set S to "Good_Rules" set, and "Bad" rules from Set S to "Bad_Rules" set (step 625). In step 640, the human expert may decide to cluster the remaining "undecided" rules in Set S using the "Clustering" operator (which the human expert selects from the graphical menu). The "Clustering" operator generates many sets of rules that the user may decide to examine using a graphical browser by selecting a "Browsing" operator from the graphic menu (step 645). The "Browsing" operator allows the user (e.g., the human expert) to examine the clusters of generated user rules by analyzing the statistics (described above) for these clusters. This process of selecting operators (from the graphical menu of available operators) can continue until, e.g., all the rules in Set S have been validated or until the human expert decides to stop the processing of the validation procedure based on at least one of the above-described stopping criteria.

The human expert may apply a number of (e.g., four) operations in sequence (e.g., two filtering operators, one clustering operator, and one browsing operator). This process can also be performed in parallel (e.g., the human expert may decide to perform two filtering operations in parallel and then combine their results).

In another embodiment of the present invention, while the human expert proceeds deeper into an validation process (i.e., performs more iterations of steps 410-430 and 445 shown in FIG. 9), the process steps may be recorded using the GUI interface.

What is claimed is:

1. A computer implemented method for generating a particular information which is at least one of a suggestion or a recommendation for at least one individual based on data associated with the at least one individual and wherein the suggestion or the recommendation is configured to be generated by an execution of instructions provided on a computer-accessible medium, the method comprising:

a) receiving at least one dynamic profile associated with the at least one individual, wherein the at least one dynamic profile comprises at least one rule of at least one individual, wherein the at least one dynamic profile is at least one of produced or updated as a function of historical data; and b) generating the at least one of the suggestion or the recommendation associated with at least one of preferences, needs or desires of the at least one individual as a function of the historical data.

2. The method according to claim 1, further comprising:

c) obtaining a collection of information for the at least one individual which is associated with the historical data; and d) obtaining further information associated with a state of the at least one individual or the collection of the information, wherein the particular information is provided as a further function of, at least in part, the further information.

3. The method according to claim 1, further comprising:

c) obtaining further information associated with external information which is capable of effecting choices of the at least one individual, wherein the particular information is provided as a further function of, at least in part, the further information.

4. The method according to claim 3, wherein the further information includes at least one of product-service location information, discount information or price information associated with at least one of a particular product or a particular service.

5. The method according to claim 1, wherein the dynamic profile is updated or generated based on a current location of the at least one individual.

6. A computer implemented method for generating a particular information which is at least one of a suggestion or a recommendation for at least one individual based on data associated with the at least one individual and wherein the suggestion or the recommendation is configured to be generated by an execution of instructions provided on a computer-accessible medium, the method comprising:

a) receiving at least one dynamic profile associated with the at least one individual, wherein the at least one dynamic profile comprises at least one rule of at least one individual, wherein the at least one dynamic profile is at least one of produced or updated as a function of historical data; and b) generating the at least one of the suggestion or the recommendation associated with at least one of preferences, needs or desires of the at least one individual as a function of the historical data c) providing the at least one of the suggestion or the recommendation based on at least one of the at least one rule.

7. The method according to claim 6, further comprising:
d) separating the rules into at least one subset;
e) determining if particular rules of the at least one subset are one of acceptable, unacceptable or undecided based on a defined criteria; and
f) providing the particular rules of the at least one subset to at least one of the at least one individual or an expert.

8. The method according to claim 7, further comprising:
g) if the particular rules are acceptable, at least one of identifying or moving the at least one subset from a previous set to a further set; and
h) if the particular rules are unacceptable, at least one of identifying or removing the at least one subset from the previous set.

9. The method according to claim 7, wherein the at least one subset includes a plurality of subsets, and wherein steps (e) and (f) are executed for each of the subsets.

10. The method according to claim 9, wherein the at least one subset is part of a set, and further comprising:
i) forming the set with the subsets using a predetermined criteria.

11. The method according to claim 7, further comprising:
j) displaying the particular rules of the at least one set; and
k) if the particular rules in the at least one subset are determined to be one of acceptable or unacceptable, correspondingly marking the at least one set as one of an acceptable subset or an unacceptable subset.

12. The method according to claim 11, wherein the at least one subset is displayed on a display device.

13. The method according to claim 7, wherein the at least one subset is part of a set, and further comprising:
l) if the particular rules of the at least one subset are marked as unacceptable, re-forming the set using the at least one subset to generate further subsets of the re-formed set; and
m) repeating steps (e) and (f) using each of the further subsets as the at least one subset.

14. The method according to claim 7, wherein the at least one subset is part of a set, and further comprising:
n) if the particular rules of the at least one subset are marked as undecided, re-forming the set using the at least one subset to generate further subsets of the re-formed set; and
o) repeating steps (e) and (f) using each of the further subsets as the at least one subset.

15. The method according to claim 14, wherein step (n) includes the substeps of:
i) combining attributes from the transactional user information into related groups,
ii) generating hierarchy data using the related groups,
iii) configuring at least a portion of the hierarchy data as a function of separation data, the separation data separating a first portion of the hierarchy data from a second portion of the attribute hierarchy data, and
iv) grouping the rules into further subsets of the set as a function of the hierarchy data and the separation data.

16. The method according to claim 15, wherein the separation data is generated based on the attribute hierarchy data and using a further criteria which is defined by an expert.

17. The method according to claim 16, wherein substep (iii) includes further substeps of:
A. generating a cut to separate the attribute hierarchy data, and B. if the cut is improperly specified or if the cut is unacceptable, generating a new cut and repeating substep A using new cut, wherein the separation data is generated as a function of at least one of the cut and the different cut.

18. The method according to claim 16, wherein substep (iv) includes the substeps of:
A. combining the rules from the set to form a first set,
B. initializing a second set,
C. retrieving a further rule from the first set,
D. if the first set does not have any rules, aborting substep (iv),
E. if the further rule corresponds to a predetermined class of a particular cluster subset in the second set, moving the further rule from the first set to the particular cluster subset, and
F. if the further rule does not correspond to the predetermined class of the particular cluster subset in the second set, generating a new cluster subset in the second set having a further class which corresponds to the further rule, and moving the further rule from the first set to the new cluster subset.

19. The method according to claim 14, wherein the at least one subset includes a plurality of subsets, and wherein step (no) includes the substep of:
i) selecting a predetermined number of the subsets in the set, and
ii) merging the predetermined number of subsets to form the further subsets.

20. The method according to claim 19, wherein the predetermined number of the subsets is selected by one of a human expert or as a function of a predetermined selection criterion.

21. The method according to claim 20, wherein the predetermined selection criteria provides that a size of the subsets is smaller than a predetermined value.

22. The method according to claim 14, wherein the at least one subset includes a plurality of subsets, and wherein step (n) includes the substep of: i) selecting a predetermined number of the subsets in the set, and ii) applying a partitioning operator to each of the selected subsets.

23. The method according to claim 22, wherein the partitioning operator includes at least one of a filtering operator and a clustering operator.

24. The method according to claim 23, wherein substep (ii) includes the substeps of:
receiving, at the filtering operator, a particular subset of the subsets, and
separating the particular subset from a first subset and a second subset of the set, the first subset including the rules which pass a predetermined selection criteria of the filtering operator, the second subset including the rules which do not pass the predetermined selection criteria.

25. The method according to claim 24, wherein the predetermined selection criteria is specified using at least one of a data mining query and a pattern template.

26. The method according to claim 7, further comprising:
p) terminating an operation of the method based on a predetermined condition.

27. The method according to claim 26, wherein the at least one subset is part of a set, and wherein the predetermined condition includes at least one of:
a first condition in which the set is empty,
a second condition in which a number of subsets in set is less than a first predetermined value,
a third condition in which a ratio of the rules in set with respect to all of existing rules is less than a second predetermined value, and a fourth condition in which an expert stops the operation of the method.

28. The method according to claim 1, further comprising:
q) after step (c), forwarding the at least one of the suggestion or the recommendation to a portable remote unit.

29. A tangible computer-accessible medium which provides thereon software to be accessed by a processing arrangement and configure the processing arrangement to generate at least one of at least one suggestion or at least one recommendation for at least one individual based on data associated with the at least one individual, the software comprising:
   a first set of instructions which, when executed on the processing arrangement, configure at least one portion of the processing arrangement to receive at least one dynamic profile associated with the at least one individual, wherein the at least one dynamic profile comprises at least one rule of at least one individual,
   wherein the at least one dynamic profile is at least one of produced or undated as a function of historical data; and
   a second set of instructions which, when executed on the processing arrangement, configure at least one portion of the processing arrangement to generate the at least one of the suggestion or the recommendation associated with at least one of preferences, interests or desires of the at least one individual as a function of the historical data.

30. A computer implemented arrangement for assisting a processing arrangement to generate at least one of at least one suggestion or at least one recommendation for at least one individual based on a particular information associated with the at least one individual, the arrangement comprising:
   a tangible computer-accessible medium which provides thereon instructions to be accessed by the processing arrangement and configure the processing arrangement to:
      receive at least one dynamic profile associated with the at least one individual, wherein the at least one dynamic profile comprises at least one rule of at least one individual,
      wherein the at least one dynamic profile is at least one of produced or updated as a function of historical data, and
      generate the at least one of the suggestion or the recommendation associated with at least one of preferences, needs or desires of the at least one individual as a function of the historical data.

31. The computer-accessible medium according to claim 29, wherein the software further comprising:
   a third set of instructions which, when executed on the processing arrangement, configure at least one portion of the processing arrangement to obtain a collection of information for the at least one individual which is associated with the historical data; and
   a fourth set of instructions which, when executed on the processing arrangement, configure at least one portion of the processing arrangement to obtain further information associated with a state of the at least one individual or the collection of the information, wherein the particular information is provided as a further function of, at least in part, the further information.

32. The computer-accessible medium according to claim 29, wherein the software further comprising:
   a fifth set of instructions which, when executed on the processing arrangement, configure at least one portion of the processing arrangement to obtain further information associated with external information which is capable of effecting choices of the at least one individual, wherein the particular information is provided as a further function of, at least in part, the further information.

33. The computer-accessible medium according to claim 32, wherein the further information includes at least one of product-service location information, discount information or price information associated with at least one of a particular product or a particular service.

34. The computer-accessible medium according to claim 29, wherein the at least one dynamic profile is generated or modified based on a current location of the at least one individual.

35. The method according to claim 6, further comprising:
q) obtaining further information associated with external information which is capable of effecting choices of the at least one individual, wherein the particular information is provided as a further function of, at least in part, the further information; and
s) associating the rules with the second information and the further information for producing additional information which relates to at least one estimated need of the at least one individual.

36. A tangible computer-accessible medium which provides thereon software to be accessed by a processing arrangement and configure the processing arrangement to generate at least one of at least one suggestion or at least one recommendation for at least one individual based on data associated with the at least one individual, the software comprising:
   a first set of instructions which, when executed on the processing arrangement, configure at least one portion of the processing arrangement to receive at least one dynamic profile associated with the at least one individual, wherein the at least one dynamic profile comprises at least one rule of at least one individual,
   wherein the at least one dynamic profile is at least one of produced or updated as a function of historical data; and
   a second set of instructions which, when executed on the processing arrangement, configure at least one portion of the processing arrangement to generate the at least one of the suggestion or the recommendation associated with at least one of preferences, interests or desires of the at least one individual as a function of the historical data,
   wherein at least one of the suggestion or the recommendation is based on the rules.

37. The computer-accessible medium according to claim 36, wherein the software further comprising:
   a third set of instructions which, when executed on the processing arrangement, configure at least one portion of the processing arrangement to separate the rules into at least one subset;
   a fourth set of instructions which, when executed on the processing arrangement, configure at least one portion of the processing arrangement to determine if particular rules of the at least one subset are one of acceptable, unacceptable or undecided based on a defined criteria; and
   a fifth set of instructions which, when executed on the processing arrangement, configure at least one portion of the processing arrangement to provide the particular rules of the at least one subset to at least one of the at least one individual or an expert.

38. The computer-accessible medium according to claim 37, wherein the software further comprising:
   a sixth set of instructions which, when executed on the processing arrangement, configure at least one portion of the processing arrangement to at least one of identify or move the at least one subset from a previous set to a further set if the particular rules are acceptable; and a seventh set of instructions which, when executed on the processing arrangement, configure at least one portion of the processing arrangement to at least one of identify or remove the at least one subset from the previous set if the particular rules are unacceptable.

39. The computer-accessible medium according to claim 37, wherein the at least one subset includes a plurality of subsets, and wherein the sixth and seventh sets of instructions are executable for each of the subsets.

40. The computer-accessible medium according to claim 39, wherein the at least one subset is part of a set, and wherein the software further comprising:

an eighth set of instructions which, when executed on the processing arrangement, configure at least one portion of the processing arrangement to form the set with the subsets using a predetermined criteria.

41. The computer-accessible medium according to claim 37, wherein the software further comprising:

a ninth set of instructions which, when executed on the processing arrangement, configure at least one portion of the processing arrangement to display the particular rules of the at least one set; and a tenth set of instructions which, when executed on the processing arrangement, configure at least one portion of the processing arrangement to correspondingly mark the at least one set as one of an acceptable subset or an unacceptable subset if the particular rules in the at least one subset are determined to be one of acceptable or unacceptable.

42. The computer-accessible medium according to claim 41, wherein the at least one subset is displayed on a display device.

43. The computer-accessible medium according to claim 37, wherein the at least one subset is part of a set, and wherein the software further comprising:

an eleventh set of instructions which, when executed on the processing arrangement, configure at least one portion of the processing arrangement to re-form the set using the at least one subset to generate further subsets of the re-formed set if the particular rules of the at least one subset are marked as unacceptable; and a twelfth set of instructions which, when executed on the processing arrangement, configure at least one portion of the processing arrangement to repeat the third and fourth sets of instructions using each of the further subsets as the at least one subset.

44. The computer-accessible medium according to claim 37, wherein the at least one subset is part of a set, and wherein the software further comprising:

a thirteenth set of instructions which, when executed on the processing arrangement, configure at least one portion of the processing arrangement to re-form the set using the at least one subset to generate further subsets of the re-formed set if the particular rules of the at least one subset are marked as undecided; and a fourteenth set of instructions which, when executed on the processing arrangement, configure at least one portion of the processing arrangement to repeat the third and fourth sets of instructions using each of the further subsets as the at least one subset.

45. The computer-accessible medium according to claim 37, wherein the software further comprising:

a fifteenth set of instructions which, when executed on the processing arrangement, configure at least one portion of the processing arrangement to terminate an operation based on a predetermined condition.

46. The computer-accessible medium according to claim 45, wherein the at least one subset is part of a set, and wherein the predetermined condition includes at least one of:

a first condition in which the set is empty, a second condition in which a number of subsets in set is less than a first predetermined value, a third condition in which a ratio of the rules in set with respect to all of existing rules is less than a second predetermined value, and a fourth condition in which an expert stops the operation.

47. The computer-accessible medium according to claim 36, wherein the software further comprising:

a sixteenth set of instructions which, when executed on the processing arrangement, configure at least one portion of the processing arrangement to obtain further information associated with external information which is capable of effecting choices of the at least one individual, wherein the particular information is provided as a further function of, at least in part, the further information; and a seventeenth set of instructions which, when executed on the processing arrangement, configure at least one portion of the processing arrangement to associate the rules with the second information and the fourth information for producing additional information which relates to at least one estimated need of the at least one individual.

48. The computer-accessible medium according to claim 36, wherein the particular information includes a static profile, the static profile including factual data associated with the at least one individual.

49. The computer-accessible medium according to claim 36, wherein the software further comprising:

an eighteenth set of instructions which, when executed on the processing arrangement, configure at least one portion of the processing arrangement to obtain a collection of information for the at least one individual which is associated with the historical data; and a nineteenth set of instructions which, when executed on the processing arrangement, configure at least one portion of the processing arrangement to obtain further information associated with a state of the at least one individual or the collection of the information, wherein the particular information is provided as a further function of, at least in part, the further information.

50. The computer-accessible medium according to claim 36, wherein the software further comprising:

a twentieth set of instructions which, when executed on the processing arrangement, configure at least one portion of the processing arrangement to obtain further information associated with external information which is capable of effecting choices of the at least one individual, wherein the particular information is provided as a further function of, at least in part, the further information.

51. The computer-accessible medium according to claim 50, wherein the further information includes at least one of product-service location information, discount information or price information associated with at least one of a particular product or a particular service.

52. The computer-accessible medium according to claim 36, wherein the the at least one dynamic profile is generated or modified based on a current location of the at least one individual.

53. A computer implemented arrangement for assisting a processing arrangement to generate at least one of at least one suggestion or at least one recommendation for at least one individual, the arrangement comprising:

a computer-accessible medium which provides thereon instructions to be accessed by the processing arrangement and configure the processing arrangement to:

receive at least one dynamic profile associated with the at least one individual, wherein the at least one dynamic profile comprises at least one rule of at least one individual, wherein the at least one dynamic profile is at least one of produced or updated as a function of historical data, and generate the at least one of the suggestion or the recommendation associated obtain with at least one of preferences, needs or desires of the at least one individual as a function of the historical data.

54. The method according to claim 1, wherein the particular information includes a static profile, the static profile including factual data associated with the at least one individual.

55. The computer-accessible medium according to claim 29, wherein the particular information includes a static profile, the static profile including factual data associated with the at least one individual.

56. The method according to claim 54, further comprising at least one of compressing or reducing the rules into modified rules so as to modify the dynamic profile associated with the at least one individual.

57. The method according to claim 56, further comprising:

e) providing the modified rules corresponding to the dynamic profile to at least one of the at least one individual or an expert;

f) selecting at least one of rule from the modified rules based on a criteria provided by at least one of a computing arrangement or the user; and g) comparing the rules to the at least one selected rule to modify the dynamic profile.

58. The computer-accessible medium according to claim 55, wherein the software further comprising:

third set of instructions which, when executed on the processing arrangement, configure at least one portion of the processing arrangement to at least one of compress or reduce the rules into modified rules so as to modify the dynamic profile associated with the at least one individual.

59. The computer-accessible medium according to claim 58, wherein the software further comprising:

a fourth set of instructions which, when executed on the processing arrangement, configure at least one portion of the processing arrangement to provide the modified rules corresponding to the dynamic profile to at least one of the at least one individual or an expert;

a fifth set of instructions which, when executed on the processing arrangement, configure at least one portion of the processing arrangement to select at least one of rule from the modified rules based on a criteria provided by at least one of a computing arrangement or the user; and a sixth set of instructions which, when executed on the processing arrangement, configure at least one portion of the processing arrangement to compare the rules to the at least one selected rule to modify the dynamic profile.

* * * * *